United States Patent [19]

Hiebert

[11] Patent Number: 5,497,887

[45] Date of Patent: * Mar. 12, 1996

[54] METHOD AND APPARATUS FOR HANDLING OBJECTS

[75] Inventor: Jacob F. Hiebert, Reedley, Calif.

[73] Assignee: Autoline, Inc., Reedley, Calif.

[*] Notice: The portion of the term of this patent subsequent to Dec. 11, 2007, has been disclaimed.

[21] Appl. No.: 168,260

[22] Filed: Mar. 15, 1988

[51] Int. Cl.$^6$ .................................................... B07C 5/02
[52] U.S. Cl. ............................ 209/538; 209/581; 209/912; 209/701; 198/779; 198/370.02
[58] Field of Search ....................... 209/539, 563–566, 209/555, 556, 558, 576, 581, 586, 587, 589, 651–654, 701, 707, 912, 925, 931, 934, 939, 538, 540; 198/365, 387, 482.1, 779, 803.01

[56] References Cited

U.S. PATENT DOCUMENTS

| | | | |
|---|---|---|---|
| 466,043 | 12/1891 | Hunt | 198/706 |
| 1,846,808 | 2/1932 | Hohn et al. | 209/912 X |
| 1,983,388 | 12/1934 | Moore | 209/912 X |
| 2,909,270 | 10/1959 | Hait | 198/395 X |
| 2,954,113 | 9/1960 | Hibbard et al. | 198/803.01 X |
| 3,013,661 | 12/1961 | Strubhar | 209/701 X |
| 3,017,024 | 1/1962 | Mumma | 209/74 |
| 3,100,571 | 8/1963 | Reck et al. | 209/938 X |
| 3,206,022 | 9/1965 | Roberts, Jr. et al. | 209/74 |
| 3,348,679 | 10/1967 | Russell | 209/84 |
| 3,489,278 | 1/1970 | Alexander | 198/779 X |
| 3,768,645 | 10/1973 | Conway et al. | 209/111.5 |
| 3,770,111 | 11/1973 | Greenwood et al. | 209/73 |
| 3,842,968 | 10/1974 | Owens | 198/189 |
| 3,910,404 | 10/1975 | Henrekson | 198/779 X |
| 3,930,995 | 1/1976 | Paddock et al. | 209/74 |
| 3,944,056 | 3/1976 | Feehery, Jr. | 198/146 |
| 4,033,450 | 7/1977 | Paddock et al. | 198/387 X |
| 4,106,628 | 8/1978 | Warkentin et al. | 209/74 |
| 4,254,877 | 3/1981 | Rose | 209/594 |
| 4,308,959 | 1/1982 | Hoover et al. | 209/563 |
| 4,586,613 | 5/1986 | Horii | 209/912 X |
| 4,726,898 | 2/1988 | Mills et al. | 209/701 X |
| 5,101,982 | 4/1992 | Gentili | 209/556 |

FOREIGN PATENT DOCUMENTS

| | | | |
|---|---|---|---|
| 0034513 | 8/1965 | Germany | 198/851 |
| 2734278 | 2/1979 | Germany | 209/701 |
| 55-98010 | 7/1980 | Japan | 198/803.01 |
| 1222497 | 4/1986 | U.S.S.R. | 198/482.1 |
| 2143491 | 2/1985 | United Kingdom . | |

*Primary Examiner*—D. Glenn Dayoan
*Attorney, Agent, or Firm*—Madson & Metcalf

[57] ABSTRACT

An apparatus for sorting objects or articles of produce according to preselected visually ascertainable criteria. Each object is singulated and transported between adjacent pairs of plural rollers attached to a conveyor chain so as to be freely rotatable on an axis oriented normal to the conveying path. A rotation control surface along the conveying path causes rotation in the rollers and in the object supported therebetween, increasing the surface of the object accessible for optical scanning. Information obtained during scanning is utilized to unload the objects. Pivotally mounted between each pair of rollers below the object transported therebetween is an elongated discharge plate. Each object is unloaded at an appropriate discharge location by pivoting upwardly the discharge plate therebelow. Pivoting of the discharge plate is caused by the activation of a diverter arm at the discharge location. The activated diverter arm directs an orientation control surface attached to the discharge plate onto a ramp adjacent the conveying path. The apparatus involves a single sorter chain having attached thereto a plurality of three parts: rollers, discharge plates, and roller mounts. Rollers and discharge plates are supported on the roller mounts, which are in turn releasably secured to the sorter chain.

60 Claims, 11 Drawing Sheets

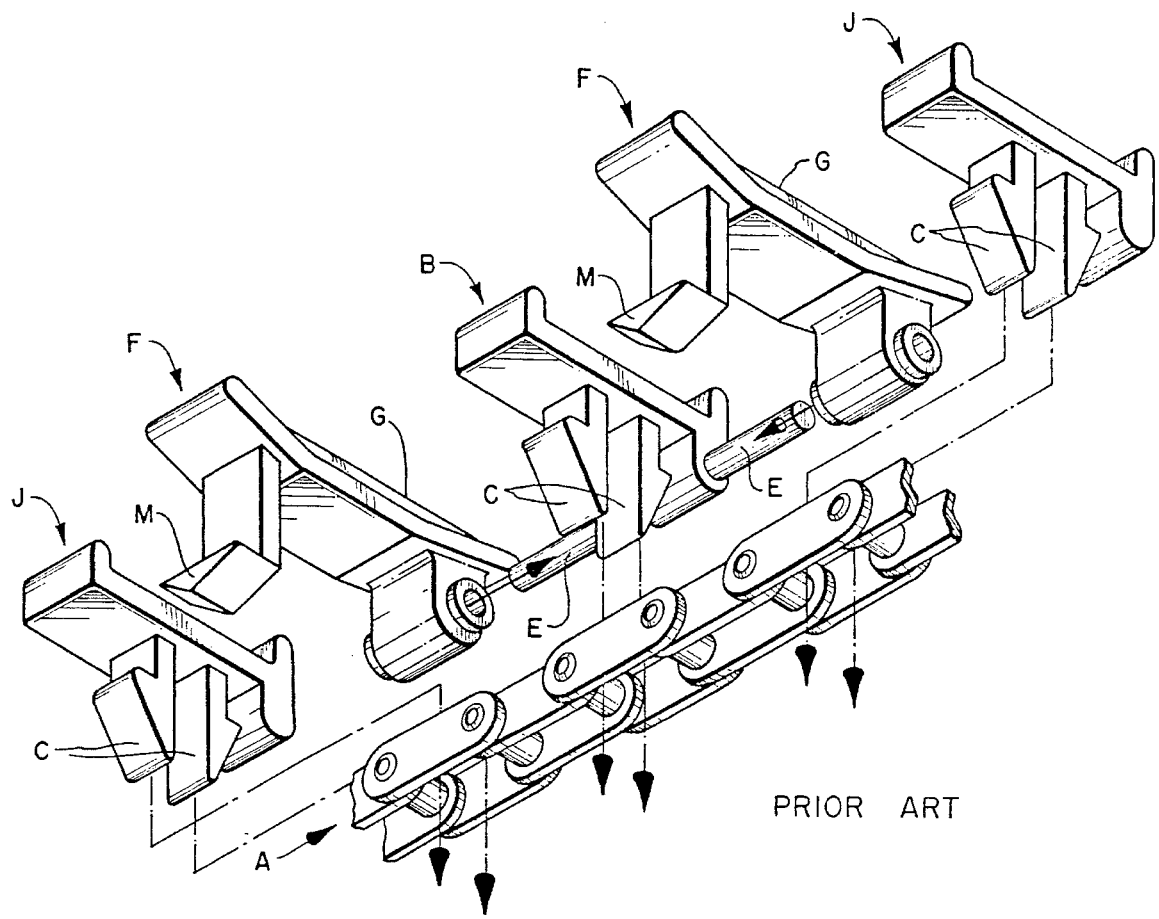
PRIOR ART
FIG. A
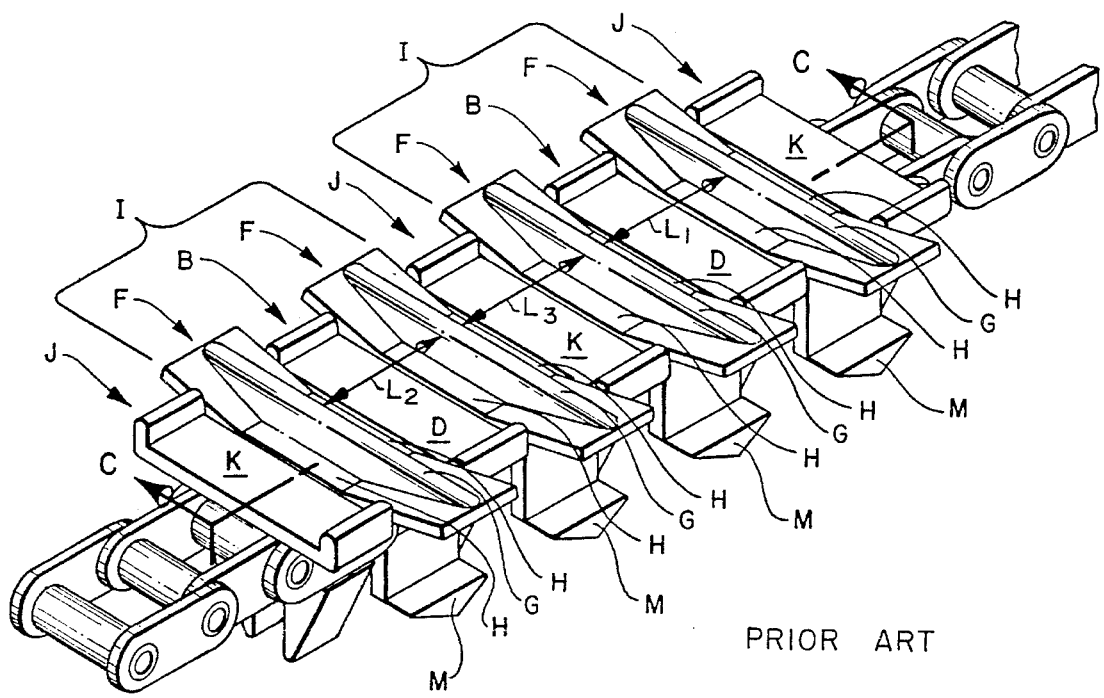
PRIOR ART
FIG. B

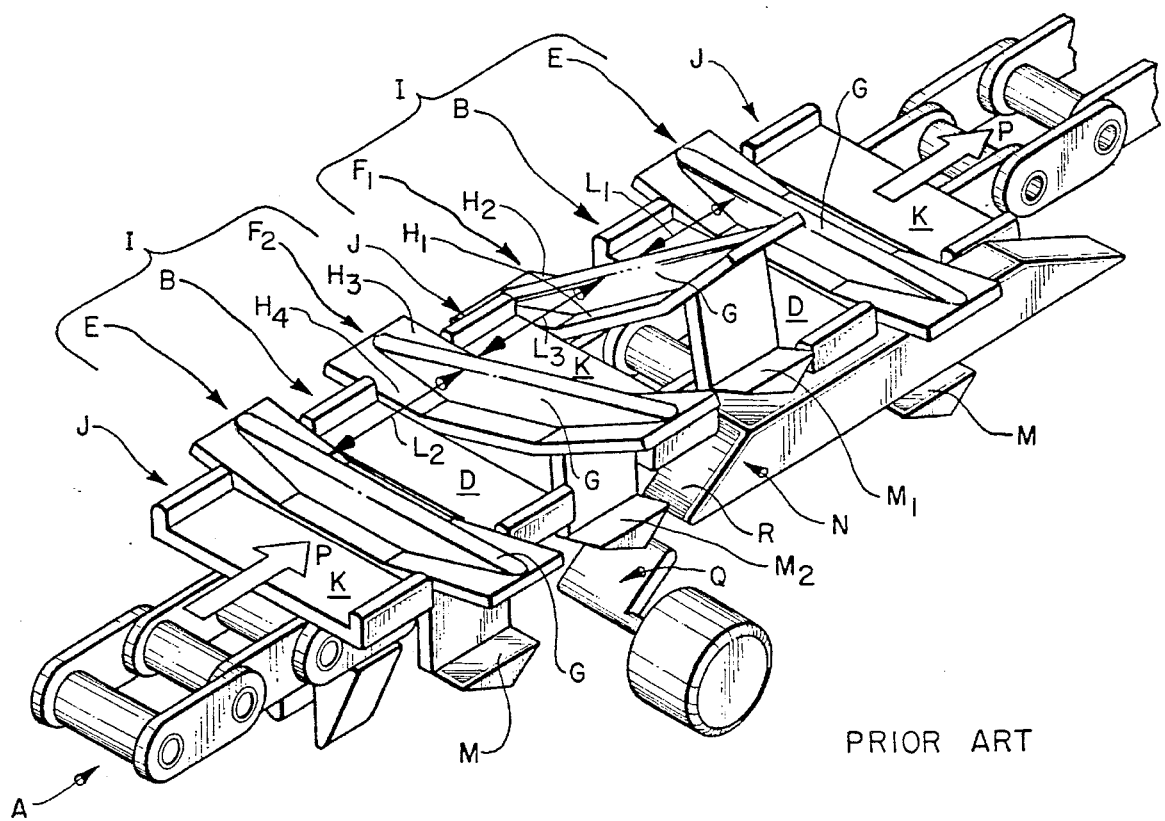
FIG. C
PRIOR ART

METHOD AND APPARATUS FOR HANDLING OBJECTS

BACKGROUND OF THE INVENTION

1. Field of the Invention

This invention relates to apparatus and methods for handling objects and, more particularly, to apparatus and methods for handling objects, such as articles of produce, for the purpose of sorting those objects according to visually ascertainable criteria, such as size, color, and defectiveness.

2. Background Art

Prior to transporting harvested produce to market, one of the major tasks which must be performed is that of properly sorting the produce. Typically, produce is sorted and packaged using a number of criteria, including size, shape, color, and quality.

The presorting of produce has a number of advantages for both consumers and produce growers. For example, through presorting, poor or spoiled produce can be removed prior to packaging, thereby reducing the likelihood of spoilage of the remaining produce during subsequent transportation and storage. The presorting of produce also permits consumers to purchase produce having general characteristics which are compatible with their needs. A restaurant owner, for example, may desire to consistently purchase some types of produce such that all of the pieces of such produce are of a substantially uniform size and quality. Further, the presorting of produce facilitates packaging and storing, since the sorted produce may usually be neatly arranged on trays or in crates.

In the past, the sorting of produce has been accomplished in a number of ways. Originally, produce was sorted entirely by hand, with the sorters being given instructions and training relating to the predetermined sorting criteria. Such a sorting method is quite imperfect and gives rise to numerous errors due to both human inconsistency and to varying applications of the sorting criteria by different individuals. Accordingly, although some hand sorting is still carried out in the produce industry, most produce sorting is now done mechanically.

One of the earliest types of mechanical sorters comprises an apparatus which conveys the produce over a series of holes or openings of progressively increasing size. For example, the produce may be directed over a series of rollers which are positioned progressively farther and farther apart. The smaller pieces of produce fall through the earlier rollers of the series, while the larger pieces are maintained on the rollers until the separation between successive rollers becomes large enough to admit them. By positioning separate collection devices or bins at various points beneath the rollers, the produce can thus be sorted according to size.

This somewhat crude apparatus for sorting produce by size has several significant drawbacks. Pieces of produce that are slightly too, large to be received in a particular opening will on occasion nevertheless become jammed in that opening. Produce is damaged or bruised in this manner, as well as due to the fall necessitated. Pieces of produce also bounce across openings which are actually large enough to receive them, thereby falling through subsequent, larger openings and being sorted improperly.

Due to the above-mentioned drawbacks, attempts have been made to develop more efficient and reliable methods for sorting produce mechanically. One of the most promising sorting methods currently in use involves scanning the produce optically in order to ascertain its characteristics. This sorting method offers the potential for greatly increasing the accuracy and reliability of sorting by size, as well as the opportunity to sort on the basis of other visual characteristics.

Although the structural requirements for a suitable optical sorting apparatus vary somewhat depending upon the type of objects to be sorted, an effective optical sorting apparatus must generally perform three separate operations. First, the objects must be singulated. That is, the individual objects must be separated physically one from another. Secondly, each object must then be individually scanned or examined in order to ascertain its characteristics. Finally, the individual objects must be sorted mechanically based upon the information obtained during scanning. Thus, an effective sorting apparatus must make provisions for effective singulating, scanning, and mechanical sorting.

These three individual functions may be performed, either by a single machine, or by a number of separate cooperating devices. Some optical sorting systems are quite complex, while others remain relatively simple.

Singulation of produce may be accomplished using a number of techniques. In one type of singulating mechanism, produce is spread in a single layer upon a relatively slow moving surface and then accelerated onto a second conveying means. The acceleration causes adjacent articles of produce to become separated slightly from one another. One device using this singulating principle employs a rotating right circular cone. The produce is advanced up the conical surface toward the apex of the cone and then allowed to recede toward the outer edges of the cone before being deposited onto a second conveyor. As articles of produce move away from the apex of the cone, their speed increases, thereby slightly separating adjacent pieces.

A second type of singulating mechanism comprises a conveyor which is formed of a plurality of cup-like carriers. As pieces of the produce are dropped onto this conveyor, each piece of produce is received in a separate carrier cup.

Once the produce has been singulated, each piece must then be optically scanned individually to ascertain its characteristics. Scanning may also be accomplished by several methods. One such method utilizes one or more photocells and corresponding light sources which are directed across the path of the produce at the photocells. For example, a photocell and a corresponding light source may be positioned so as to detect the passing of all produce of a particular height. By using a sequence of such photocells, the height of each individual article of produce can be determined. A second photocell and light source may be positioned adjacent the first to measure the length of each article of produce. This can be accomplished by connecting the second photocell to an appropriate timing and summing circuit.

Alternatively, it is possible to use a single two-dimensional array of photocells and corresponding light sources. The size of each article of produce is then determined based on the magnitude of the total current emitted by the entire photocell array. Although both of these scanning methods have been somewhat successful in measuring size, it has not been possible to use them to determine other characteristics of the produce, such as color or quality.

The most promising optical scanning method currently in use employs a line-scan camera. Such a camera can readily function to measure the size of an article of produce quite accurately, and some are capable of measuring the sizes of several articles of produce simultaneously. Perhaps more importantly, however, line-scan cameras can be programmed to simultaneously determine the color of each article of produce, as well as to detect certain kinds of produce defects.

Once the characteristics used to distinguish articles of produce have been ascertained by scanning, the produce must be sorted mechanically in accordance with that predetermined sorting criteria. Sorting mechanisms for use with optical scanners are of two general types. The first employs a plurality of solenoid-activated rams which selectively knock individual articles of produce off the produce conveyor. The produce is thus grouped in an appropriate one of a series of storage containers in accordance with the sorting criteria.

A second type of sorting mechanism comprises a plurality of cup-shaped carriers which each hold a single article of produce. The bottoms of individual carriers may be selectively opened by actuation of any one of a plurality of solenoids, each located adjacent a different storage container. The appropriate solenoid to be activated is determined based on the scanning data, thereby allowing each article of produce to drop through the cup-shaped carrier into one of the storage containers for grouping according to the preselected sorting criteria.

In use, one of the above-described sorting mechanisms is connected to an optical scanning mechanism in some suitable manner. For example, a solenoid-controlled ram may be positioned immediately adjacent a photocell to form a scanning and sorting station. If the photocell detects a article of produce of the appropriate size, the adjacent solenoid is actuated so as to knock that article of produce off the conveyor into an adjacent storage area. Otherwise, the article of produce is conveyed to the next scanning and sorting station for visual evaluation according to an adjusted size criteria.

Alternatively, scanning may be performed by a camera which is connected to a computer. The computer temporarily stores scanning information relating to the size, color, and/or quality of each article of produce. Being further provided with information relating to the speed of the produce conveyor, the computer is then able to trigger the appropriate sorting mechanism when each article of produce reaches the location at which it should be removed.

The mechanisms for singulating, scanning, and sorting produce may be combined in a number of ways so as to effectively perform the entire sorting operation. For example, one type of machine which performs each of the essential operations comprises a conveyor having a plurality of carrier cups, the bottoms of which are capable of being opened selectively by solenoids along the line of travel of the conveyor. One article of produce is dropped into each carrier cup and scanned by a line-scan camera. Each article of produce is then deposited into an appropriate one of a series of sorting containers by selectively actuating the solenoid located adjacent to the appropriate sorting container. This is perhaps the most common type of mechanical produce sorter currently in use.

Devices employing carrier cups do not effectively singulate the produce. It is very common, for example, for two or more articles of produce to be deposited into a single carrier cup or to be otherwise stacked on top of one another when being optically scanned. Although efforts have been made to create mechanisms that detect when produce stacking has occurred, there has been little success in doing so. Consequently, stacked articles of produce are often perceived by the scanning device of a sorter as a single article of produce and accordingly sorted improperly. This impairs the proper sizing of produce, and also makes it difficult to obtain an accurate count of the number of articles of produce that have been processed.

Other complications result because in order to accurately determine all of the desired characteristics of the produce, it is necessary to scan each article of produce from two or more directions. In sorting devices employing carrier cups, a defective article of produce may drop into a carrier cup oriented in such a manner that the defect is entirely on the bottom side thereof. As a result, a single scanning device located above the carrier cup cannot detect the defect as the article of produce is scanned.

A further problem is that such sorters are slow and inefficient in their use of space. For example, in known sorter devices using carrier cups individual articles of produce are typically positioned 10 to 12 inches apart on the produce conveyor. This results in a great deal of unused space between each article of produce, increasing needlessly the size of the sorter. As the maximum speed of the conveyor is limited by the resolution of the scanning device, a substantial amount of time is also wasted due to the distance between adjacent articles of produce being handled by the sorter.

Another type of sorting device that is known includes a sorting section which tilts the objects to the side of the conveyor after they have been scanned. Objects to be sorted by the device are conveyed to a scanning station. The optical scanning device detects preselected information about the objects which is stored in a data processing memory and thereafter used to operate the sorter section of the apparatus to selectively unload the objects by tilting them off the conveyor at different locations so as to group the objects according to preselected sorting criteria. Examples of this type of device are illustrated in U.S. patent applications Ser. Nos. 515,313 and 516,450.

A brief understanding of the structure and functioning of the sorter section of such a device will be facilitated by reference to FIGS. A–C. The sorter section of this type of device can be seen to comprise a continuous chain A and a plurality of distinct types of sorter pieces that are releasably attached thereto. The sorter pieces include a mounting element B that is releasably connectable directly to the top of chain A by resilient legs C. As clearly shown in FIG. B., the top of mounting element B is formed into a flat elongated support face D that is used to uphold objects to be sorted. Pivot pins E extend outwardly parallel to chain A from each side of mounting element B.

Each pivot pin E receives a rocker element F, the second type of sorter piece. The top of rocker element F accordingly rests adjacent to and is generally coplanar with support face D of the mounting element B by which it is upheld. Once mounted, rocker element F is capable of upward pivoting about pivot pin E.

Mounting element B and the two rocker elements F pivotably upheld on either side thereof together form a link set I. Releasably securable directly to the top of chain A at the outside of each link set I, is the third type of sorter piece, a spacer element J. The top of each spacer element J is provided with an elongated flat support face K which is similar in shape, orientation, and function to support face D on the top of each mounting element B. When attached to chain A adjacent to rocker element F, spacer element J serves to hold rocker element F on pivot pin E of mounting element B as chain A makes its return. Chain A is filled along its entire length by link sets I and intervening spacer elements J attached in this manner.

The space between the raised ribs G of consecutive pairs of rocker elements F defines a carrying pocket L which receives individual objects from the scanning station of the apparatus. FIG. B illustrates that carrying pockets L are formed both within and between successive link sets I on chain A.

Simultaneous pivoting of the two consecutive rocker elements F at the sides of a carrying pocket L will cause rocker element support faces H to encounter the object in the carrying pocket. Further pivoting of the rocker elements will then lift and tilt the object off the conveyor, tipping the object off the side of the sorting section. In this manner individual objects can be selectively removed at any of a number of different sorting locations along the sorter section.

The process of pivoting consecutive pairs of rocker elements F to tilt an object out of conveying pocket L therebetween does not require striking the object. The motion involved is smooth and gradual and does not cause damage to the objects. Nevertheless, even the improved sorter section components depicted in FIG. A are afflicted with significant disadvantages.

For example, emptying a single conveying pocket L requires the upward tilting of both rocker elements F on either side thereof. This is accomplished through the use of projecting feet M extending from each rocker element E and a plurality of stationary ramps N located along chain A near the line of travel of projecting feet M. Movement of chain A in the direction indicated by arrows P draws projecting feet M toward and past each ramp N. Normally, projecting feet M do not interact with ramps N. In this case no unloading of objects occurs.

On the other hand, if unloading of a specific object at a given discharge point is appropriate, a selectively operable diverter arm Q at the lead end R of ramp N is mechanically or electrically brought into an activated position. In that position projecting feet M of the two rocker elements F on either side of the object are diverted out of their normal line of travel, onto and over ramp N. In the process, the rocker elements F to which projecting feet M are attached are tilted upwardly, lifting and tipping the object in carrying pocket L from chain A.

Two functional flaws have become apparent in this manner of operation. As shown in FIG. C, for a chain A moving in the direction indicated by arrow P, the upward motion imparted to any pair of rocker elements F is not strictly simultaneous. In relation to carrying pocket $L_3$ projecting leg $M_1$ of lead rocker element $F_1$ encounters diverter arm Q before projecting leg $M_2$ of trailing rocker element $F_2$. Correspondingly, the lead side of any object in carrying pocket $L_3$, will be lifted in advance of the trailing side of that same object. Rather than directing the object from chain A in a direction normal thereto, this has the effect of initially tilting the contents of the carrying pocket $L_3$ backwards in relation to the motion of chain A. Objects discharged from the sorting section of the device of FIG. C are thus tipped from chain A in an imprecise manner, using a somewhat complex motion.

Furthermore, the mechanics of raising both rocker elements together in order to discharge a single object is complicated. For each single object discharged, diverter arm Q must remain in its activated position long enough for two rocker elements to be drawn past. This mechanical functioning is a challenge to coordinate, requiring highly precise operation of the machinery involved and, where an attempt is made to automate the sorter to its optimum degree, complex software.

Another disadvantage results. Rocker element F has on the top thereof two rocker element support faces H, one on either side of raised rib G. Each of these two rocker element support faces H form a part of two different adjacent conveying pockets L. Thus, rocker element support face $H_1$ on rocker element $F_1$ is part of carrying pocket $L_3$, while rocker element support face $H_2$, also on rocker element $F_1$, is part of carrying pocket $L_1$. This fact has negative implications. The practical consequence is that objects in conveying pockets on both sides of the one from which an object is to be discharged must endure jostling, even when not being removed from the sorter section. An ideal sorter would permit each object to be unloaded individually, without imparting movement of any kind to objects being carried in adjacent conveying pockets.

In order to avoid this result, objects are frequently carried only in alternate, rather than in successive, conveying pockets Lo As a result, however, half of the length of chain A of the sorter section of such devices is empty. The object handling rate of the device is thus effectively halved, and complicated feed mechanisms must be devised for supplying objects from the scanning station to the sorting section so that only alternate conveying pockets L are filled.

SUMMARY OF THE INVENTION

One object of the present invention is an improved method and apparatus for handling, and especially for optically sorting, objects such as articles of produce, in which singulating, scanning, and sorting functions can be performed on one conveyor, minimizing the transfers of objects during handling.

It is also an object of the present invention to provide such method and apparatus wherein the scanning of more than one side of each of the objects is accomplished by rotating the object and in which such scanning takes place in the same conveying pocket in which the objects are singulated, transported, and ultimately unloaded according to predetermined sorting criteria.

It is a further object of the present invention that in such a method and apparatus, the objects are substantially adjacent during handling so as to minimize the overall size of the apparatus and to enhance the speed of its operation. Thus, it is an object of the present invention that all conveying pockets for objects be fully usable without creating any operating disadvantage in adjacent conveying pockets. In this regard, a further, related object of the present invention is to permit the discharge of objects from such a device without affecting the stability of an object in an adjacent conveying pocket.

Yet another object of the present invention is to provide a method and apparatus in which discharge is effected in a more simple manner, utilizing only a single element to tilt and discharge an object, without imparting any backward or destabilizing motion to the objects being discharged.

Still another object of the present invention is to effect the discharge of objects in a method and apparatus through the use of a minimum number of moving parts for each object handled. As a further related objective, the present invention aims to reduce to a minimum the inventory of different parts required for attachment to the chain of a mechanical sorter.

Additional objects and advantages of the invention will be set forth in the description which follows, and in part will become apparent from the description, or may be learned by the practice of the invention. The objects and advantages of the invention may be realized and obtained by means of the instruments and combinations particularly pointed out in the appended claims.

Broadly stated, to achieve the foregoing objects, a mechanical sorter and a corresponding method is provided which employs a single conveyor chain and chain attachment assemblies releasably secured thereto that are each comprised of only three different parts. Each chain attachment assembly singulates the objects or articles of produce, transports them through the apparatus, rotates them to permit full optical scanning, and discharges them using a non-damaging, smooth tilting motion using but a single movable component. All processing of each object is provided by a single object handling unit that comprises two adjacent rollers and an elongated discharge plate. The rollers alone support the object. Between the rollers and below the object is a single, pivotably mounted elongated discharge plate that effects unloading.

BRIEF DESCRIPTION OF THE DRAWINGS

For the purpose of describing sorter devices known in the art, the following drawings have already been discussed as part of the background:

FIG. A is an exploded perspective view of a sorter chain and sorter pieces for attachment thereto in a known sorter apparatus;

FIG. B is a detailed perspective view of the sorter chain and sorter pieces of FIG. A assembled one to another; and FIG. C is a detailed perspective view of the sorter chain of FIG. B with sorter pieces attached thereto illustrating the manner of discharging objects therefrom.

Figure 1:
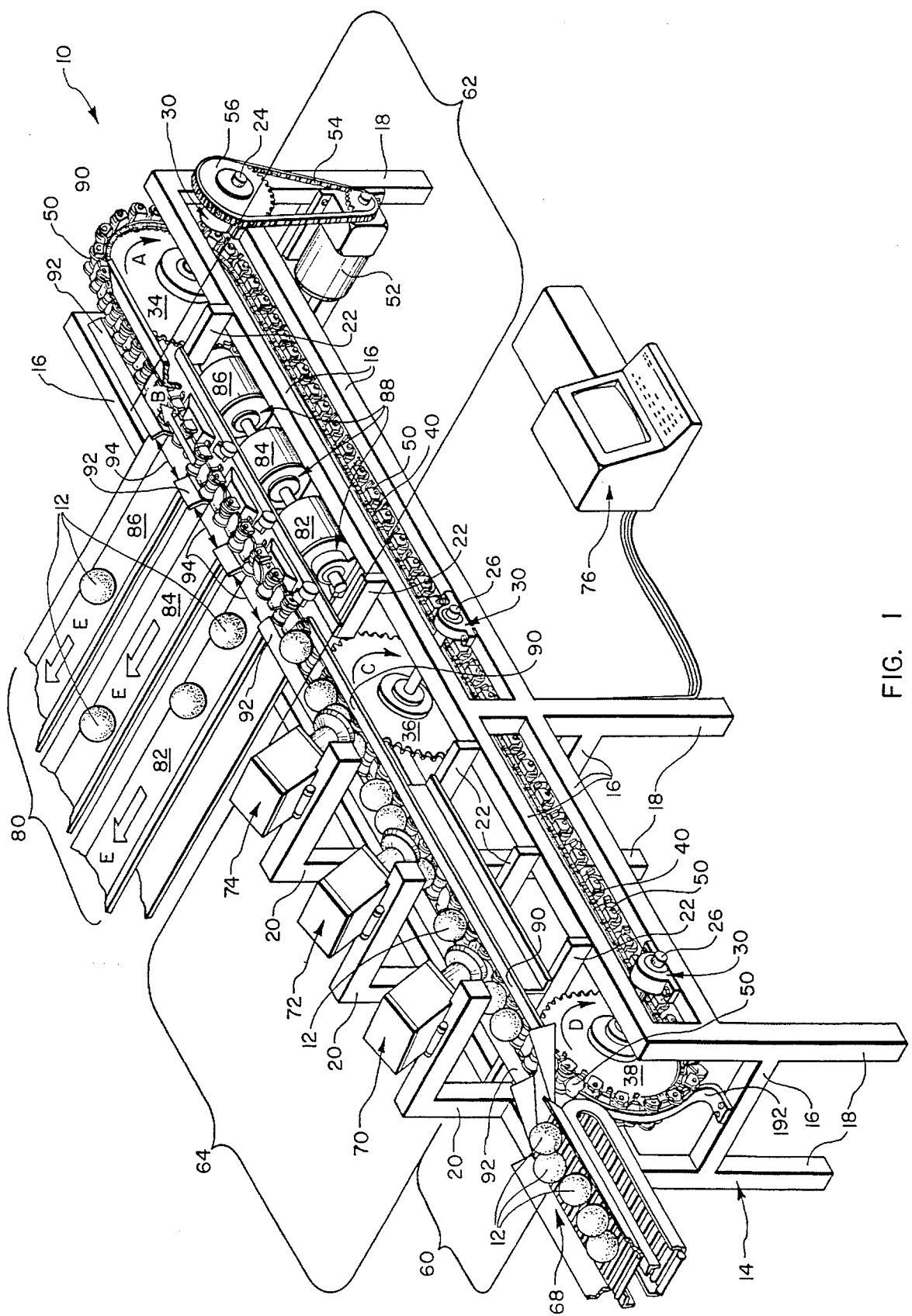
Figure 2:
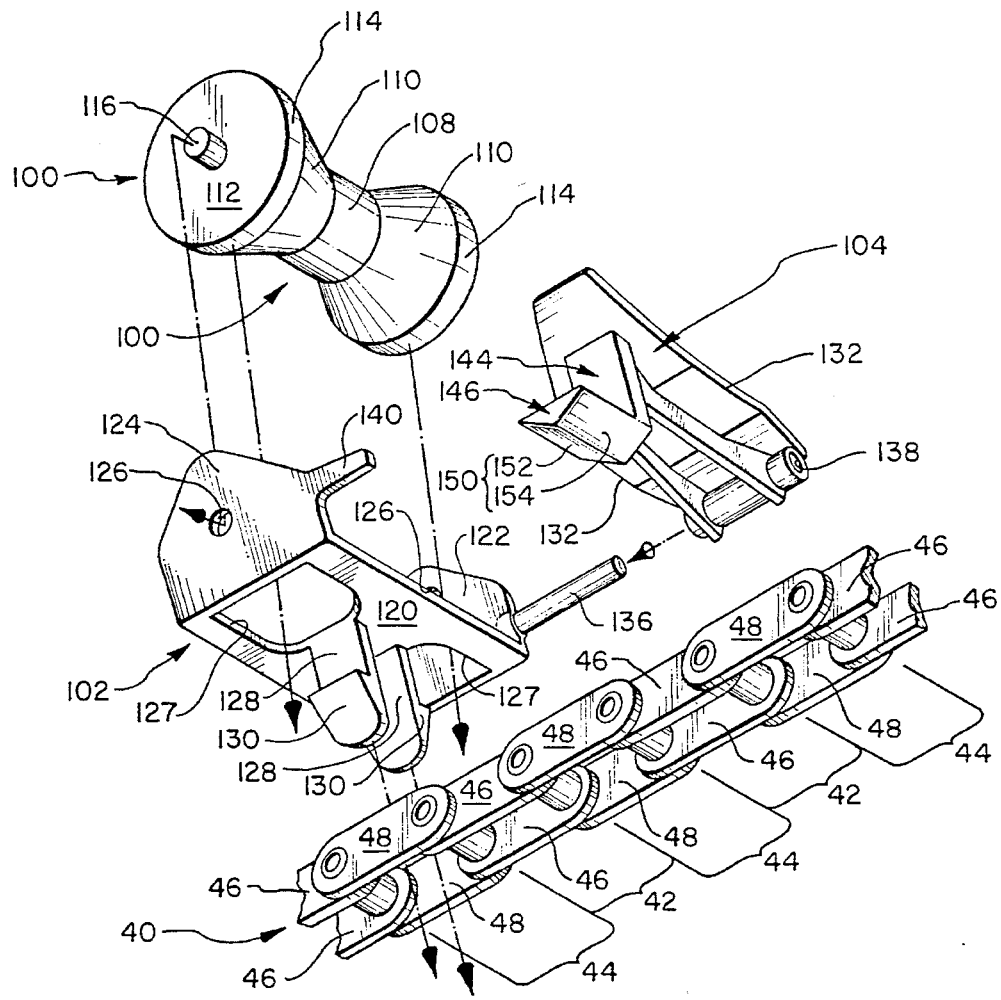
Figure 3:
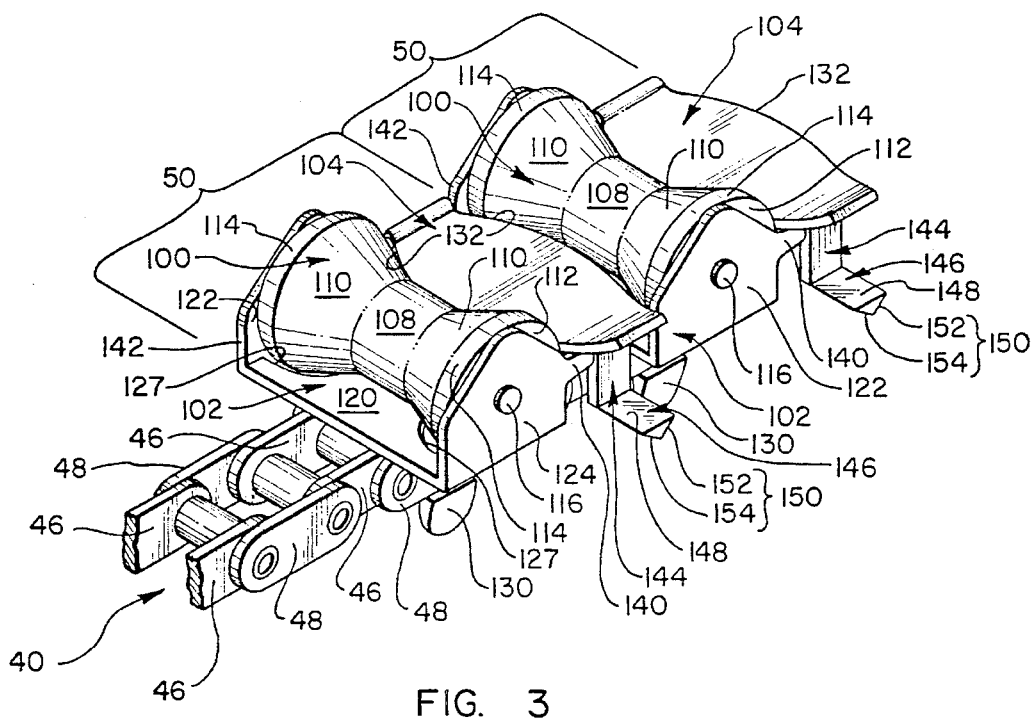
Figure 4:
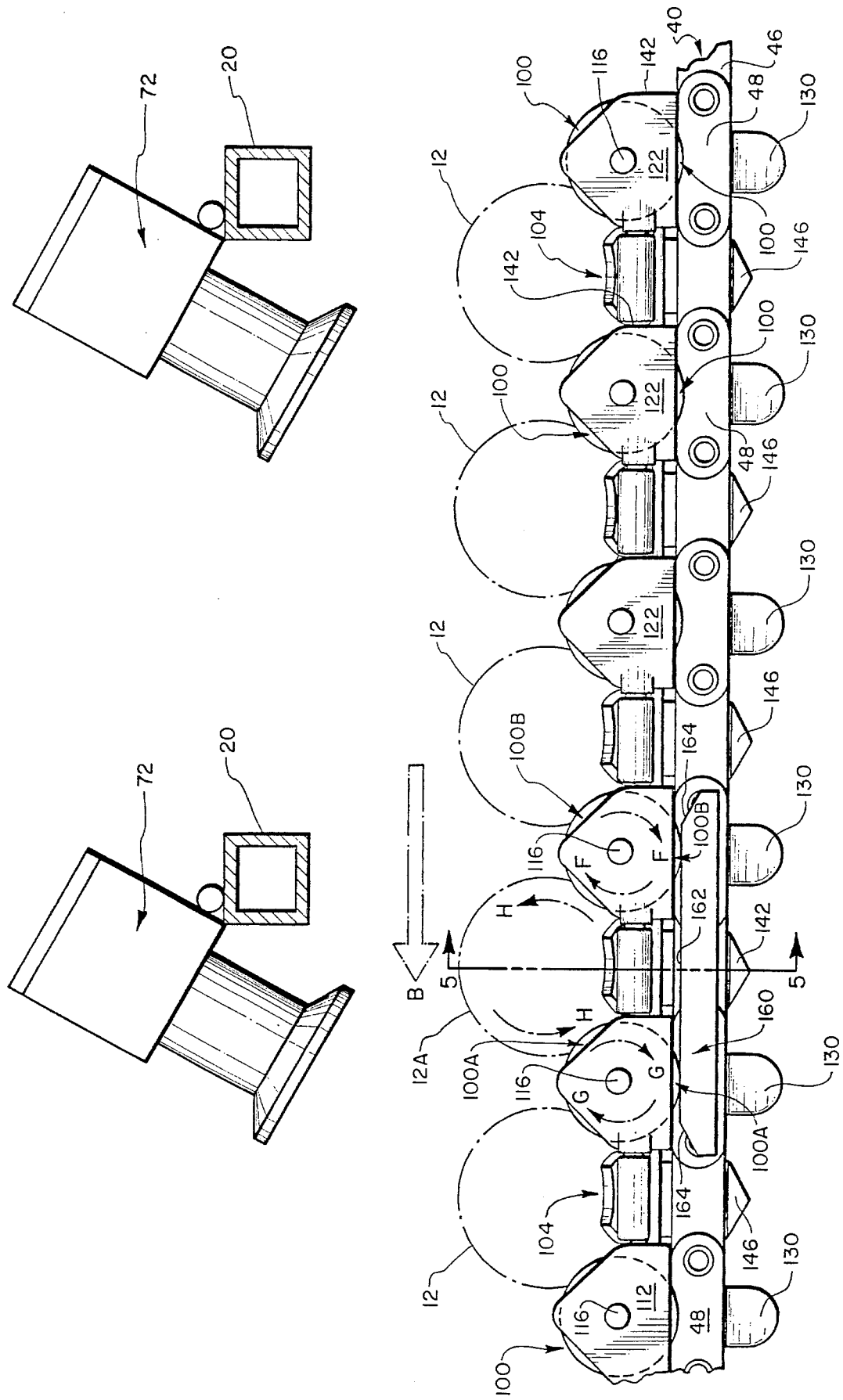
Figure 5:
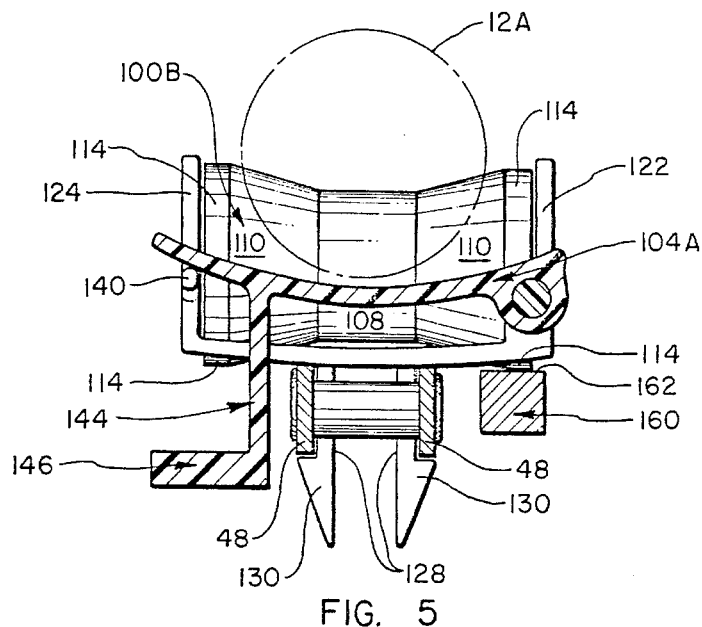
Figure 6:
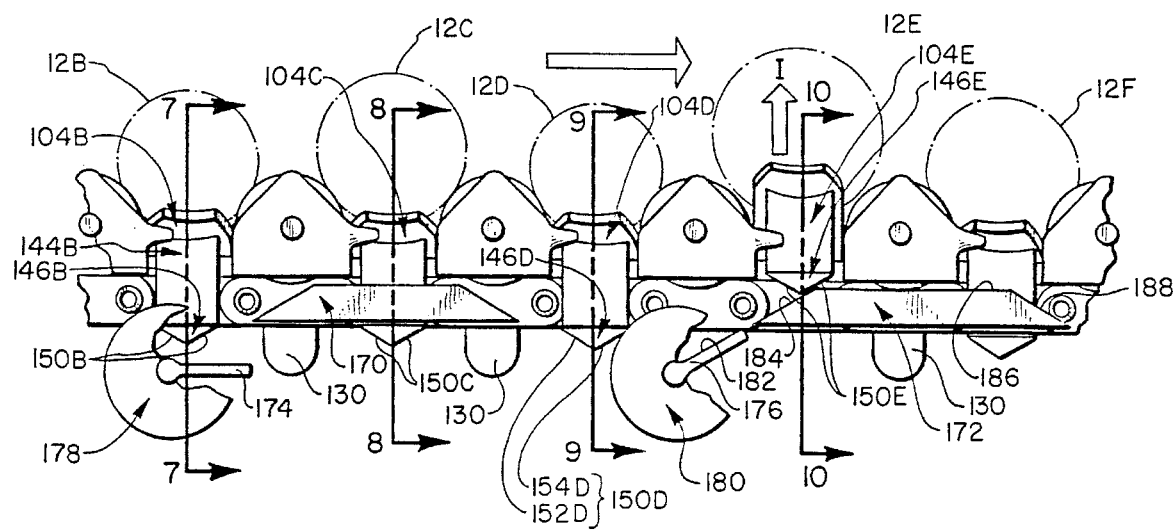
Figure 7:
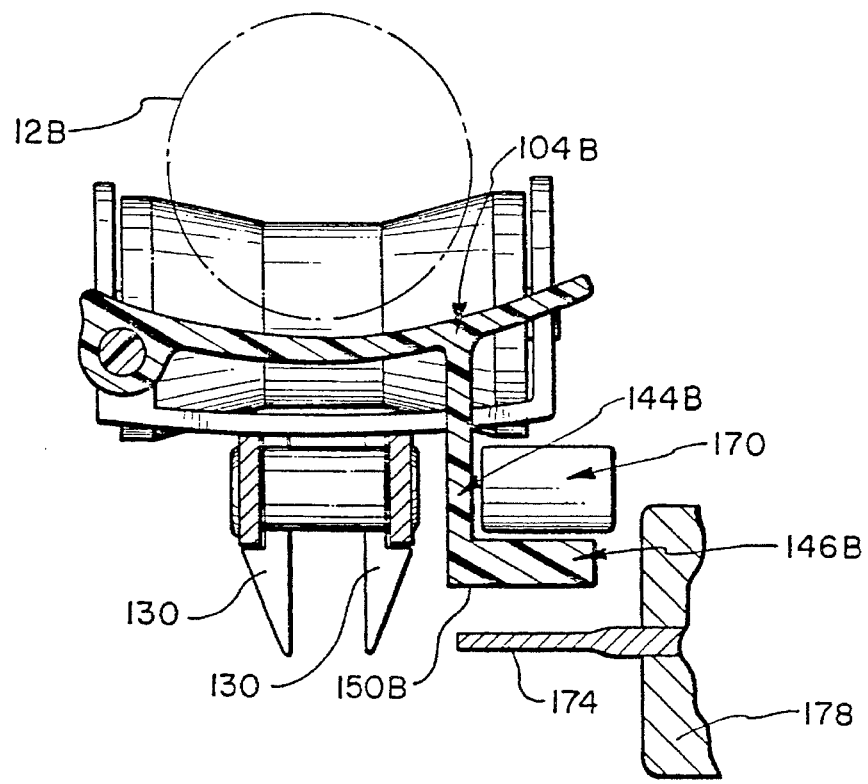
Figure 8:
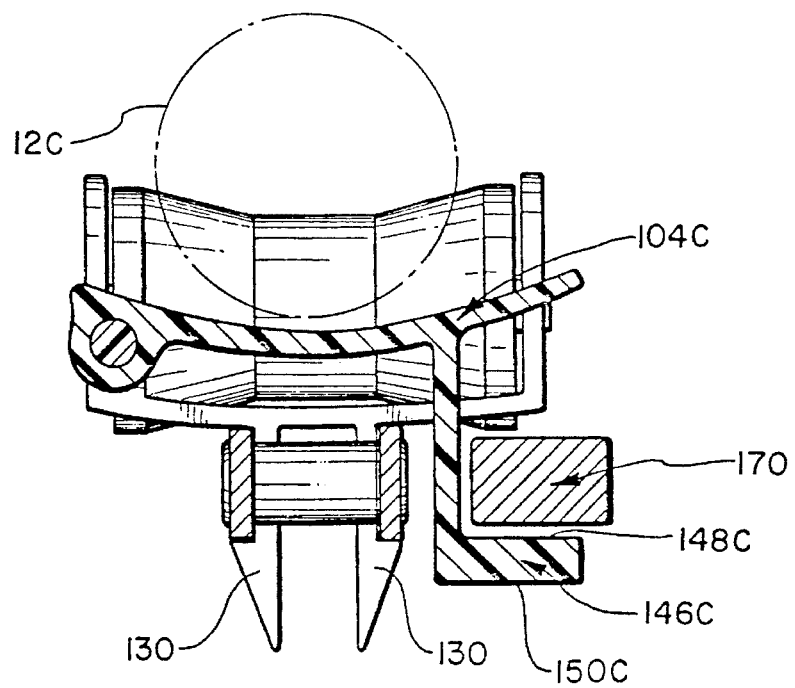
Figure 9:
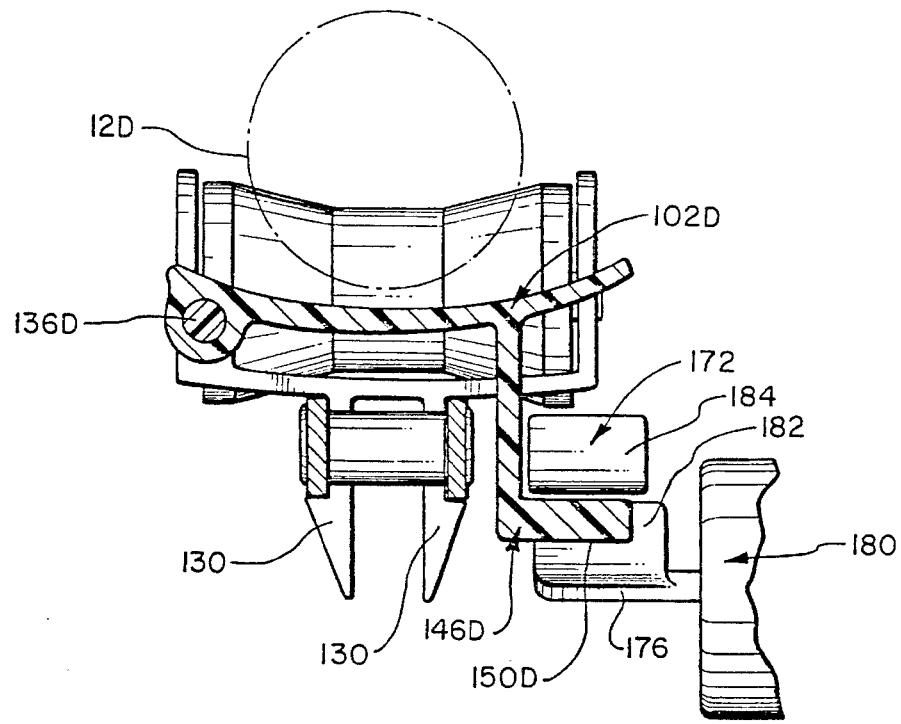
Figure 10:
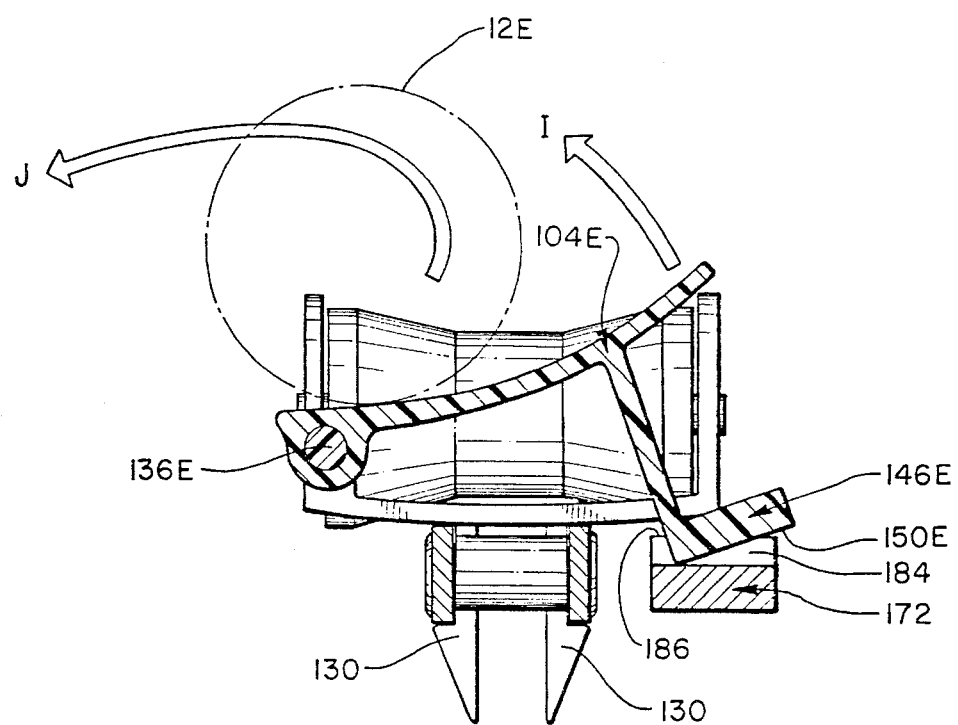
Figure 11:
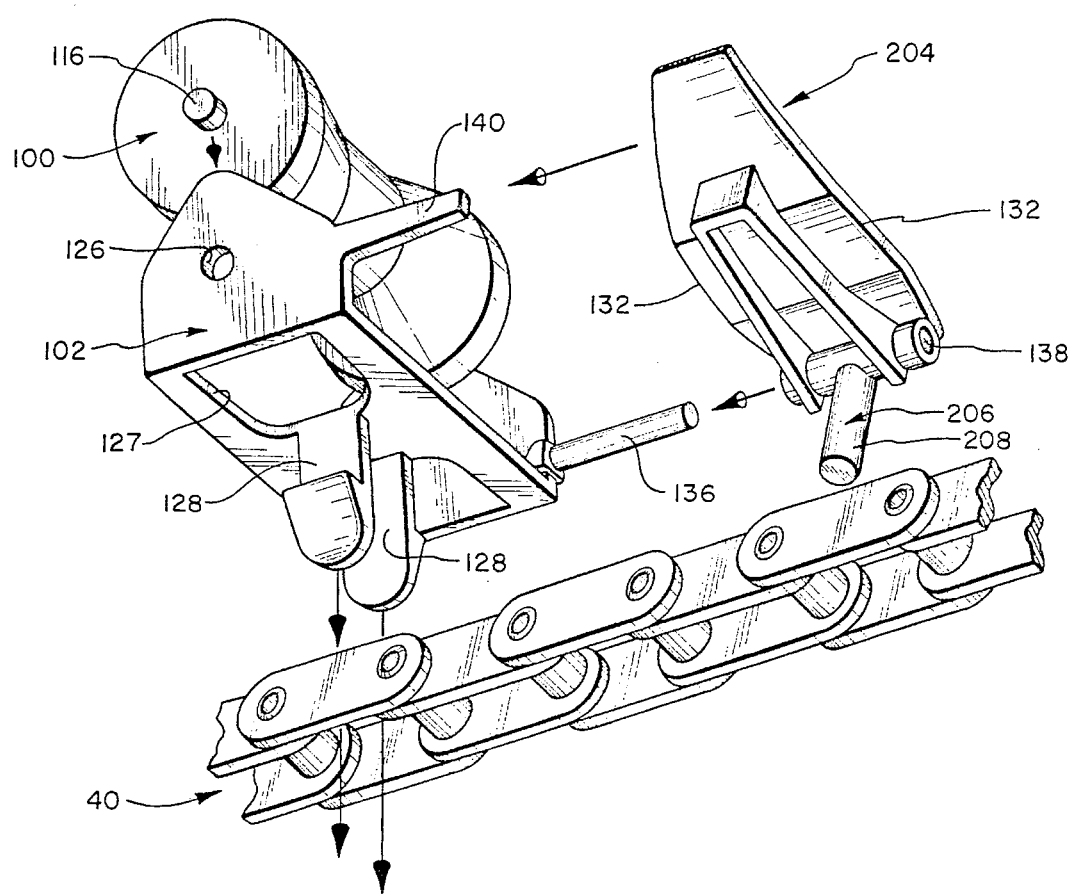
Figure 12:
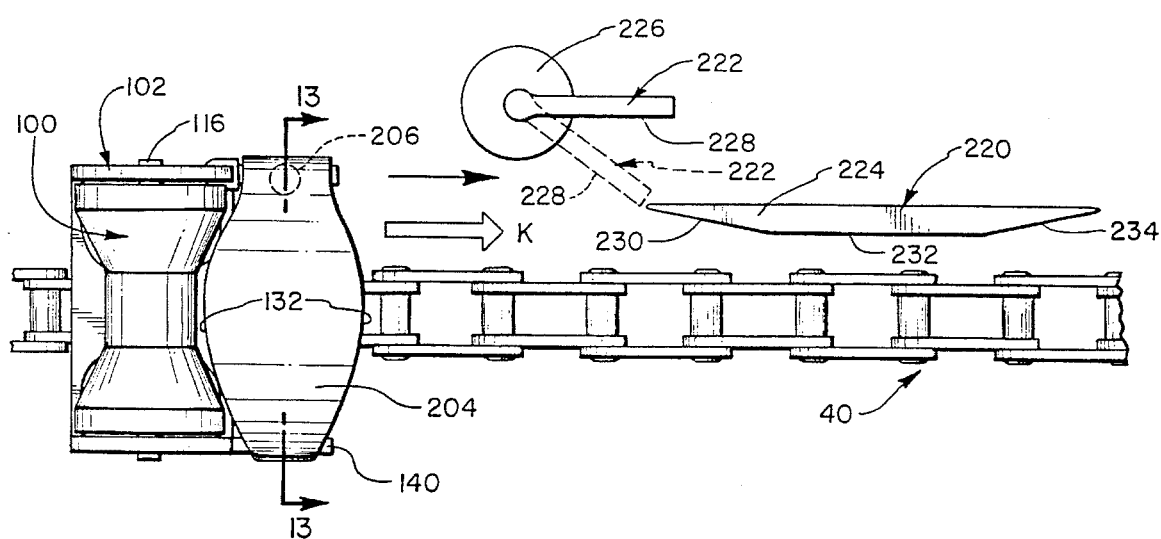
Figure 13A:
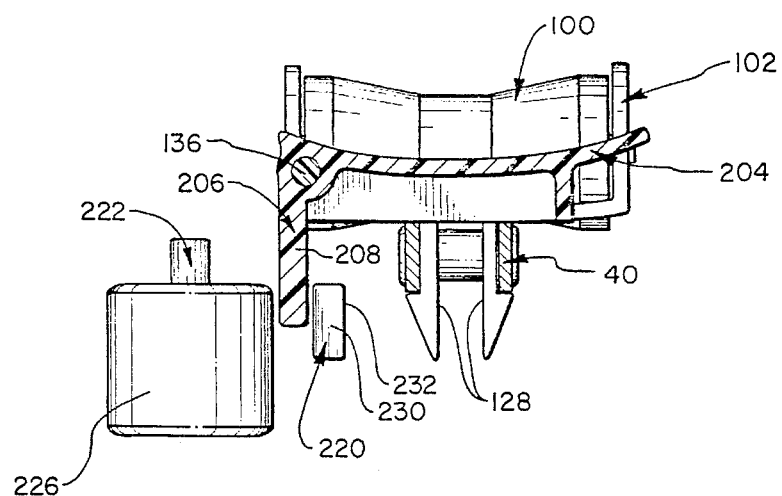
Figure 13B:
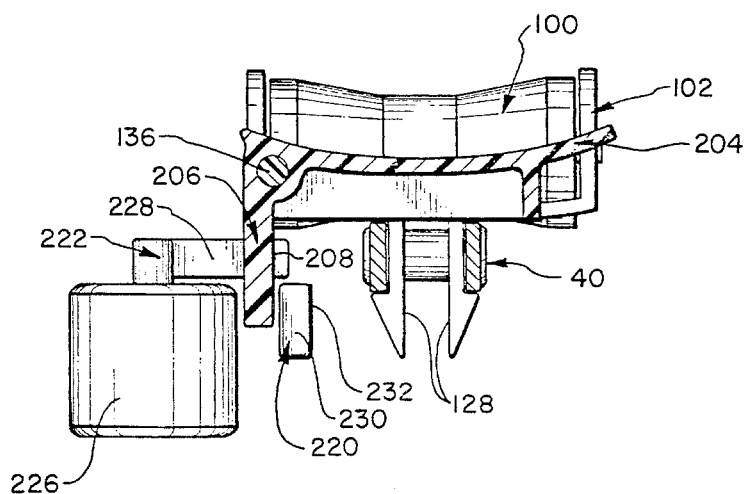
Figure 14:
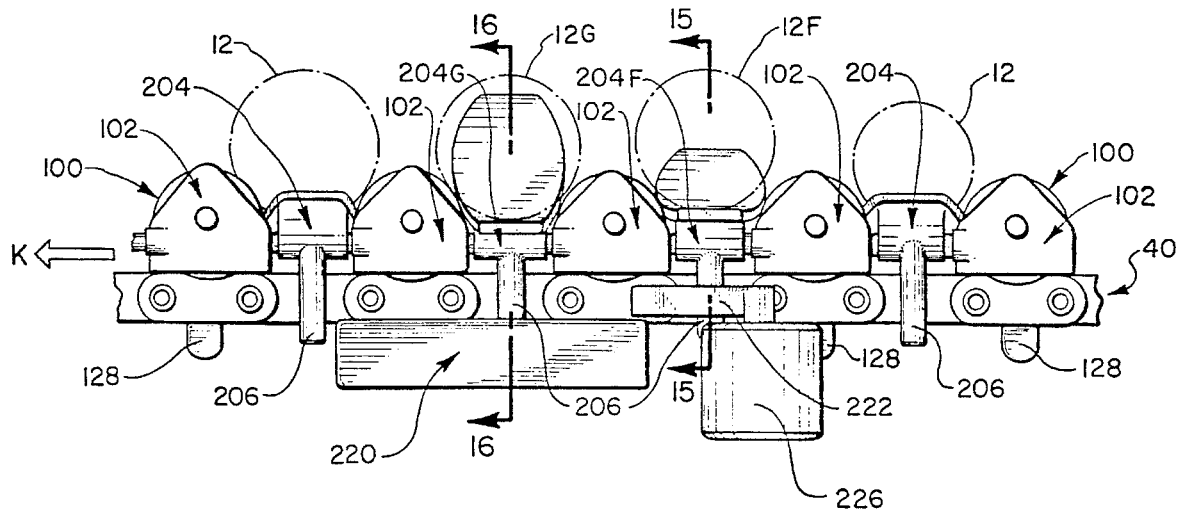
Figure 15:
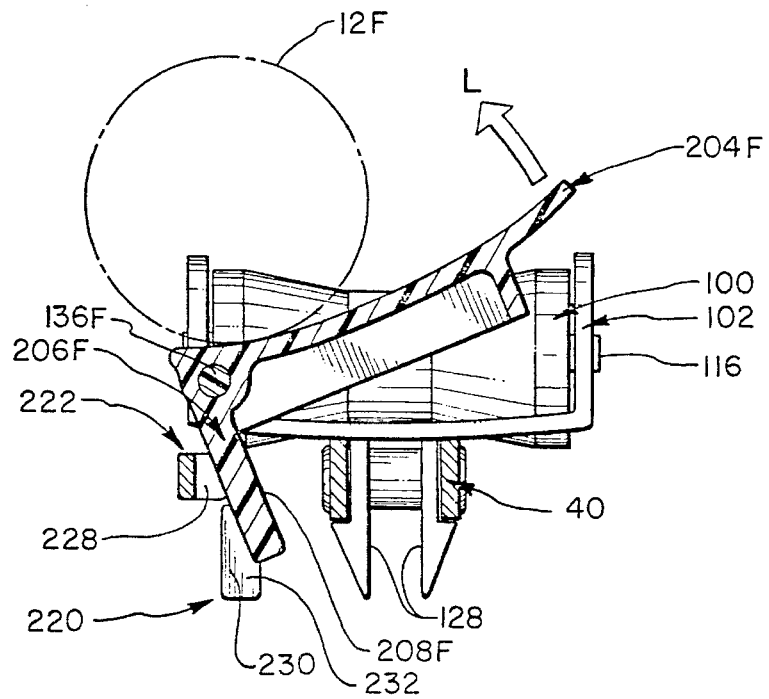
Figure 16:
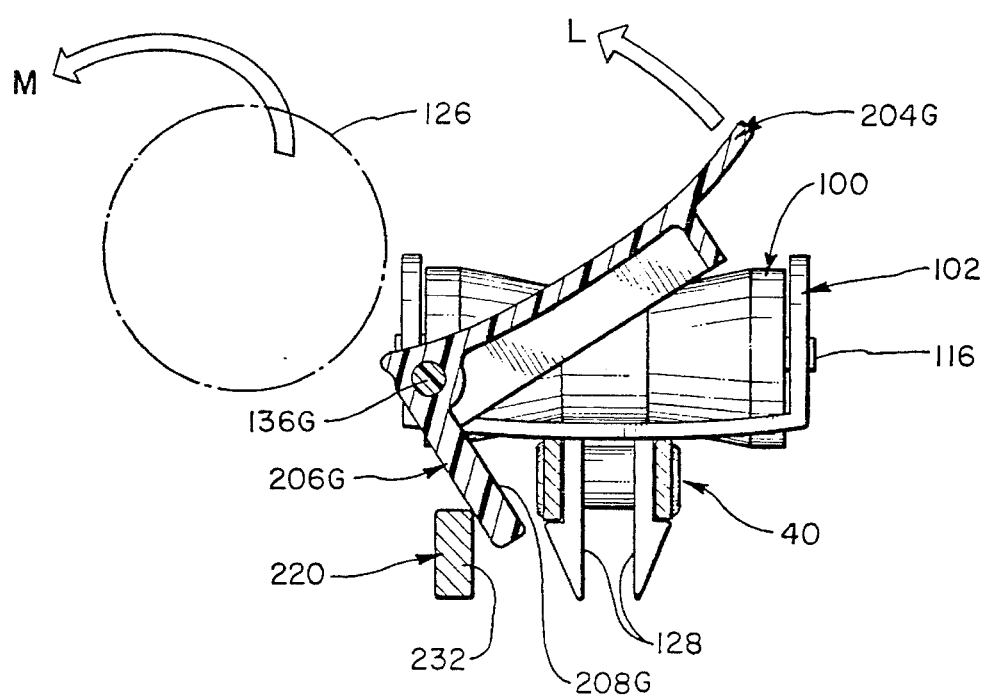

In order to more fully describe the manner in which the advantages and objects of the present invention are obtained, a more particular description of the presently preferred embodiments or best mode of the invention will be described with additional detail through the use of the following drawings in which:

FIG. 1 is a perspective view of one presently preferred embodiment of an optical sorter apparatus according to the present invention;

FIG. 2 is an exploded perspective view of a sorter chain and the Components of a chain attachment assembly for attachment thereto in the optical sorter apparatus shown FIG. 1;

FIG. 3 is a detailed perspective view of an adjacent pair of chain attachment assemblies attached to the sorter chain of the optical sorter apparatus shown in FIG. 1;

FIG. 4 is a detailed elevation view of the optical sorter apparatus of FIG. 1 taken at the optical scanning station thereof depicting the rotation of objects being transported by the apparatus;

FIG. 5 is a cross-sectional elevation of an object-handling unit of the device shown in FIG. 1 taken along section line 5—5 of FIG. 4;

FIG. 6 is a detailed elevation view of the optical sorter apparatus of FIG. 1 taken at the output station thereof illustrating the operation of the activation means of the present invention;

FIG. 7 is a cross-sectional elevation view of the optical sorter apparatus of FIG. 1 taken along section line 7—7 of FIG. 6;

FIG. 8 is a cross-sectional elevation view of the optical sorter apparatus of FIG. 1 taken along section line 8—8 of FIG. 6; and FIG. 9 is a cross-sectional elevation view of the optical sorter apparatus of FIG. 1 taken along section line 9—9 of FIG. 6;

FIG. 10 is a cross-sectional elevation view of the optical sorter apparatus of FIG. 1 taken along section line 10—10 of FIG. 6;

FIG. 11 is an exploded perspective view of a sorter chain and the components of an alternate configuration of a chain attachment assembly for attachment thereto;

FIG. 12 is a plan view of the chain attachment assembly of FIG. 11 attached to a sorter chain and approaching the diverter arm and activation ramp of such an optical sorter apparatus;

FIG. 13A is a cross-sectional elevation view of the chain attachment assembly of FIG. 12 taken along section line 13—13 therein with the diverter arm in the non-activated position thereof;

FIG. 13B is a cross-sectional elevation view of the chain attachment assembly of FIG. 12 taken along section line 13—13 therein with the diverter arm in the activated position thereof;

FIG. 14 is a detailed elevation view of a sequence of the chain attachment assemblies of FIG. 11 at an output station of an optical sorter apparatus;

FIG. 15 is a cross-sectional elevation view of the chain attachment assemblies of FIG. 14 taken along section line 14—14 shown therein; and FIG. 16 is a cross-sectional elevation view of the chain attachment assemblies of FIG. 14 taken along section line 16—16 shown therein.

DESCRIPTION OF THE PREFERRED EMBODIMENT

The object handling apparatus of the present invention may be used for a number of different purposes, but that disclosed herein finds its primary utility as a mechanical sorter, particularly of objects, such as produce, which are typically sorted on the basis of visual characteristics and which require careful handling to prevent or minimize damage to the objects being sorted.

FIG. 1 provides an overview of the major subcomponents of one embodiment of a mechanical sorter 10 configured according to the teachings of the present invention. Mechanical sorter 10 is particularly adapted to the sorting of articles of produce 12 shown in various stages of processing by mechanical sorter 10.

The various functional elements of mechanical sorter 10 are supported upon a frame 14 which may be configured in any suitable manner from a rigid material, such as steel. Frame 14 may take the form shown in FIG. 1 comprising a plurality of horizontal rails 16 supported by a number of vertical legs 18. It may be desirable in some instances to mount frame 14 permanently within a building or to form it as an integral part of a building structure. On the other hand, it may be desirable to construct frame 14 such that mechanical sorter 10 may be easily transported from one place to another. Advantageously in such circumstances, legs 18 of frame 14 could be provided with adjustable feet (not shown) to facilitate the leveling and stabilizing of frame 14.

Any frame, such as frame 14, for use with a specific embodiment of a sorter incorporating the teachings of the present invention will necessarily include additional, less substantial elements tailored to the needs of that embodiment for supporting individual functional components thereof. An example of such a less substantial supporting element can be observed in frame 14 of mechanical sorter 10 in the form of overhead booms 20 and cross-pieces 22, the functions of which will become apparent subsequently.

Rotatably mounted to frame 14 are axle rods 24, 26, 28 which are set in bearings 30 attached to a horizontal rail 16 thereof. Axle rods 24, 26, 28 have secured thereto sprocket wheels 34, 36, 38, respectively, which lie substantially in the same vertical plane. Sprocket wheel 36 intermediate sprocket wheels 34, 38 is provided primarily as auxiliary support for the structure mounted on sprocket wheels 34, 38 and could be enhanced, omitted, or deleted in favor of other suitable supporting means.

Movably suspended from frame 14 on sprocketed wheels 34, 36, 38 is a sorter chain 40 comprised of a plurality of links connected one to another to form an endless loop. As best seen in FIGS. 2 and 3, sorter chain 40 may comprise a double pitch roller chain comprised of alternate roller links 42 and pin links 44 which form alternate narrow side plates 46 and wide side plates 48, respectively.

Attached to sorter chain 40 are a plurality of chain attachment assemblies 50 shown diagrammatically without substantial detail in FIG. 1, but disclosed with specificity in relation to FIGS. 2 and 3 subsequently. A motor 52 mounted to frame 14 is operatively connected through a drive belt 54 and a sprocket drive wheel 56 on axle rod 24 to rotate sprocketed wheel 34 in the direction shown by arrow A. In combination motor 52, drive belt 54, and sprocket drive wheel 34 serve as a typical drive means for advancing the upper portion of sorter chain 40 in the direction indicated by arrows B. Sprocketed wheels 36 and 38 being interconnected with sorter chain 40 thus also follow in rotation in the direction indicated by arrows C and D, respectively.

In this manner the upper portion of sorter chain 40 defines a conveying path between a produce input station generally indicated at the bracket 60 and a produce generally shown at bracketed portion output station 62. Intermediate produce input station 60 and produce output station 62 along the conveying path is a scanning station indicated generally at the bracketed portion 64. At input station 60 produce 12, is fed onto sorter chain 40 by a suitable feed mechanism 68 and singulated by chain attachment assemblies 50 prior to further processing. It is the nature of chain attachment assemblies 50 that produce 12 is then rotatably supported and transported along the conveying path to scanning station 64.

At scanning station 64, articles of produce 12 are inspected for the purpose of ascertaining how each is to be sorted. Thus, scanning station 64 includes a scanning means for detecting in individual articles of produce 12 the presence of any predetermined sorting criteria by which grouping thereof is to be effected. As shown in FIG. 1, by way of example and not limitation, a plurality of three optical scanning devices 70, 72, 74, such as line-scan cameras, are supported on overhead booms 20 above the conveying path defined by the upper portion of sorter chain 40.

Produce 12 being transported along that conveying path from input station 60 to output station 62 pass within the range of optical scanning devices 70, 72, 74 which detect preselected information about the size and/or visual appearance of each article thereof. The information is transmitted to and stored in the data processing memory of a computer 76 and used thereafter, according to the speed of sorter chain 40, to operate mechanisms in output section 62 for grouping produce 12 in accordance with predetermined sorting criteria.

Use of optical scanning devices 70, 72, 76 which are line-scan cameras, is considered highly advantageous to the sorting of produce 12 in accordance with visual characteristics other than just size. Nevertheless, optical scanning devices 70, 72, 74 could also within the scope of the teachings of the present invention comprise one or more pairs of corresponding photo cells and light sources, or even two-dimensional arrays of such, if size is the only sorting criteria to be employed. On the other hand, there may be instances in which object scanning in other than visual modes, such as ultrasonic, radiation, or x-ray scanning, is appropriate in the handling and sorting of objects according to the teachings of the present invention. These methods of non-visual scanning are, accordingly, considered to be within the scope of the scanning means of the present invention. It should also be noted that at slow enough speeds of sorter chain 40, the detection of predetermined sorting criteria in objects, such as articles of produce 12, could be accomplished by agricultural laborers, although in all probability without taking advantage of the benefits of speed, efficiency, and accuracy available through mechanized forms of scanning.

It is a significant feature of the method and apparatus of the present invention that during the time that produce 12 is traversing scanning station 64, it may be selectively rotated on a continuing or occasional basis, and to any predetermined extent, while supported by chain attachment assemblies 50. This activity is undertaken in order to increase the surface area of produce 12 that is accessible to a scanning means, such as optical scanning devices 70, 72, 74. The manner in which this rotation is accomplished will be more easily appreciated once the detailed structure of chain attachment assemblies 50 has been elaborated subsequently.

In any case, however, the precise physical relationship between the point or points along the conveying path in scanning station 64 at which this rotation is effected and the point or points at which scanning occurs is entirely a function of design convenience. Some optical scanning devices, in cooperation with suitable data processing hardware and software, will be able to detect and gather data about the surface of articles of produce 12 while these are in the process of being rotated. In such cases, the point at which rotation occurs should be within the range of the optical scanning device employed.

On the other hand, computer software or hardware limitations, or the optical characteristics of the optical scanning device utilized, may permit the effective detection of visual characteristics only if the objects scanned are not in rotation during scanning. Under such circumstances, objects can be scanned at a first point along the conveying path, rotated a preselected amount, as for example 90° or 120° at a second point on the conveying path, and then scanned again at a third successive point therealong. Additional alternate rotations and scannings to the extent desired can be used to afford access to the entire surface of the objects involved. Thus, the inclusion in scanning station 64 of mechanical sorter 10 of three separate optical scanning devices 70, 72, 74 reflects the use of this latter type of intermittent rotation of articles of produce 12 between each of optical scanning devices 70, 72, 74.

Once scanned, produce 12 is advanced by movement of sorter chain 40 in the direction of arrow B into output station 62 where articles of produce 12 are selectively and individually tipped from sorter chain 40 at appropriate discharge locations. The produce 12 discharged from sorter chain 40 at each discharge location is collected separately, resulting in produce 12 being sorted according to the preselected sorting criteria.

Thus, in accordance with the present invention, collection means are provided located at object output station 62 for receiving selected produce 12 tipped from sorter chain 40. As shown by way of example, and not limitation, mechanical sorter 10 includes a collection conveyor shown at bracket 80 having a plurality of parallel moveable belts, 82, 84, 86 extending beneath sorter chain 40 at each discharge location in output section 62. The belts 82, 84, 86 of collection conveyor 80 are driven in the directions shown by arrows E by individual collection conveyor motors 88. Produce 12 tipped from sorter chain 40 is thus received on one of the belts 82, 84, 86 of collection conveyor 80 and moved away from sorter chain 40 in a direction normal to the conveying path defined by the upper portion thereof. The number of belts in a collection conveyor, such as collection conveyor 80, is adjusted so as to correspond to the number of discharge locations at output station 62 of the mechanical sorter 10.

As depicted in FIG. 1, retaining walls 90, 92 are positioned adjacent each side of sorter chain 40 along the conveying path defined by the upper portion thereof. Retaining walls 90, 92 slope downwardly toward a position closely adjacent to chain attachment assemblies 50 on sorter chain 40. Retaining walls 90, 92 thus prevent produce 12 from rolling off the side of sorter chain 40 while being singulated at output station 60 or rotatably supported and transported through scanning station 64. Retaining wall 90 extends without interruption substantially the full length of mechanical sorter 10. Retaining wall 92, however, is on the side of sorter chain 40 on which articles of produce 12 are discharged in output station 62. Therefore, in output station 62, retaining wall 92 is interrupted by openings 94 corresponding to each of the discharge locations at which belts 82, 84, 86 of collection conveyor 80 are located. Belts 82, 84, and 86 of collection conveyor 80 are each positioned directly beneath openings 94 in retaining wall 92, preferably as close to sorter chain 40 as possible. Thus, produce 12 may be diverted from sorter chain 40 onto belts 82, 84, 86 without falling any significant distance. Supplementally, inclined ramps (not shown) may be provided bridging the height between each opening 94 and the corresponding belt of collection conveyor 80 in order to provide a smoother transition for diverted produce 12.

The overview of the function and structure of mechanical sorter 10 completed above will now permit a clear understanding of the nature of chain attachment assemblies 50 and the manner in which articles of produce 12 are through the use thereof singulated, rotated for scanning, and ultimately removed from sorter chain 40. In FIG. 2 the components of a preferred embodiment of a chain attachment assembly incorporating teachings of the present invention are shown individually to illustrate the manner of their assembly with each other and with sorter chain 40. By way of example, each chain attachment assembly 50 comprises a roller generally designated at 100, a roller mount generally designated at 102, and a discharge plate generally designated at 104. In FIG. 3 two sets of the same components are depicted assembled one to another and removably attached in succession to sorter chain 40.

The components of a chain attachment assembly according to the present invention may be formed in a wide variety of different configurations and of virtually any suitable material. For example, roller 100, roller mount 102, and discharge plate 104 may be formed of molded plastic. Such a construction would enable those components to be relatively light, facilitating their handling, and to be manufactured inexpensively, so as to be easily replaced when damaged. Alternatively, however, one or all of roller 100, roller mount 102, and discharge plate 104 could be formed of rubber, metal, or some other suitable material. It is conceivable that an inventory of such components made of various different materials could be intermixed and used together in the same mechanical sorter 10.

Roller 100 comprises a central cylindrical section 108 of relatively reduced diameter and frusto-conical peripheral sections 110 at each end thereof. Frusto-conical sections 110 are so oriented that the larger ends thereof are remote from cylindrical section 108, terminating in flat cylindrical end faces 112. Optionally, the remote ends of frusto-conical sections 110 immediately adjacent ends 112 or rollers 100 are formed into thin cylindrical circumferential portions 114. Each roller 100 is provided with a pair of mounting axles 116 which extend from end faces 112 of roller 100 coaxially therewith. Mounting axles 116 are utilized to rotatably mount each roller 100 in a corresponding roller mount 102.

It is the function of roller mount 102 to support a roller 100 for rotation about the axis thereof. Each roller mount 102 is in turn directly attached to sorter chain 40. Roller mount 102 includes an elongated planar floor portion 120 which is slightly longer than the roller 100 that is to be mounted in roller mount 102. The longitudinal ends of floor portion 120 turn upwardly in two parallel end plates 122, 124 having holes 126 formed centrally therein. The resilience of the material of which roller mount 102 is fabricated permits roller 100 to be snapped into roller mount 102 with each mounting axle 116 of roller 100 extending through one of holes 126 in end plates 122, 124. In this position, end plates 122, 124 do not press against end faces 112 of roller 100, thereby permitting roller 100 to rotate freely about the axis defined by mounting axles 116.

The diameter of circumferential portions 114 of roller 100 is greater than the height of hole 126 above floor portion 120 of roller mount 102. To permit mounting and free rotation of roller 100 in roller mount 102, and for other purposes disclosed subsequently, floor portion 120 of roller mount 102 is formed with roller access windows 127 through which circumferential portions 114 of roller 100 extend when roller 100 is mounted in roller mount 102. Thus, circumferential portions 114 project below floor portions 120 of roller mount 102, as seen most clearly in FIG. 4.

According to the present invention, fastening means are provided for releasably securing a roller mount, such as roller mount 102, to sorter chain 40. As best shown in FIG. 3, by way of example and not limitation, a pair of resilient legs 128 depend from floor portion 120 of roller mount 102 on the side thereof opposite from end plates 122 and 124. The end of each leg 128 remote from roller mount 102 is formed into a hook 130. In the embodiment shown, hooks 130 extend outwardly from each of resilient legs 128.

Roller mount 102 is releasably secured to an individual link of sorter chain 40 by the insertion of resilient legs 128 within, for example, wide side plates 48 of pin links 44 thereof. Roller mount 102 is advanced toward its seated position on pin link 44, and hooks 130 cause resilient legs 128 to be forced inwardly toward each other by wide side plates 48. Once hooks 130 have passed the bottom edge of side plates 48, resilient legs 128 snap outwardly into their original positions, and hooks 130 extend around the bottom of side plates 48 to retain roller mount 102 on sorter chain 40. Roller mount 102 may be detached from sorter chain 40 by pressing resilient legs 128 toward each other so that hooks 130 clear the bottom edges of wide side plates 148, permitting the withdrawal of resilient legs 128 from pin link 44.

It should be understood that through properly proportioning the distance between resilient legs 128, roller mount 102 could be fabricated so as to be releasably secured in a similar manner to narrow side plates 46 of roller links 42. Although the arrangement depicted in FIG. 2 is considered preferable, the distance between resilient legs 128 could be increased to fit around the outside of an individual link of sorter chain 40, and hooks 130 at the ends thereof be oriented inwardly 128 so as to fit around the bottom of the sides of individual links of sorter chain 40 from the outside thereof. To release roller mount 102 from sorter chain 40 it would then be necessary to force resilient legs 128 outwardly.

The third and final element of each chain attachment assembly 50 is elongated discharge plate 104. As shown in FIG. 3, when assembled with the other elements of chain attachment assembly 50 secured to sorter chain 40, discharge plate 104 is supported on a roller mount 102 in a substantially horizontal position between rollers 100 of adjacent pairs of chain attachment assemblies 50. As shown, discharge plate 104 is upwardly concave and has longitudinal edges 132 which oppose and generally match the profile of the rollers 110 of the adjacent pair of chain attachment assemblies 50 between which it is supported.

As best understood by reference to FIG. 2, mounting of discharge plate 104 in a chain attachment assembly 50 involves a pivot pin 136 that extends from end plate 122 of roller mount 102 parallel to the conveying path defined by the top portion of sorter chain 40. Correspondingly, discharge plate 104 is provided at one end thereof with a pivot pin bore 138 which is slightly larger in cross section than that of pivot pin 136. Pivot pin bore 138 is slidably received on pivot pin 136 to mount discharge plate 104 to roller mount 102. In this manner, discharge plate 104 is rendered capable of rotational motion about pivot pin 136.

A discharge plate brace 140 extends outwardly from end plate 124 of roller mount 102 on the same side thereof as pivot pin 136. Brace 104 passes under discharge plate 104 and in combination with pivot pin 136 supports discharge plate 104 in its substantially horizontal position between rollers 100 of adjacent chain attachment assemblies 50, the position depicted in FIG. 3. As brace 140 prevents downward rotation of discharge plate 104 from its substantial horizontal position, discharge plate 104 is thus capable of only upward tilting movement about pivot pin 136 therefrom.

By the attachment to sorter chain 40 of successive chain attachment assemblies 50, is each discharge plates 104 is retained on its corresponding pivot pin 136. In a series of successive chain attachment assemblies 50 attached to the same sorter chain 40 the vertical edge 142 of end plate 122 on the opposite side thereof from pivot pin 136 opposes the remote end of pivot pin 136 in the chain attachment assembly 50 adjacent thereto. This blocks the removal of corresponding discharge plate 104 from the pivot pin 136 on which it is mounted. Each chain attachment assembly 50 attached to sorter chain 40 in a sequence cooperates with an adjacent chain attachment assembly 50 to maintain discharge plate 104 thereof in proper position. This relationship may best be appreciated by reference to FIG. 4.

A final feature of discharge plate 104 requires explanation prior to passing from FIGS. 2 and 3 to a discussion of the manner in which the three components of chain attachment assembly 50 cooperate to perform the various functions thereof. Depending from discharge plate 104 at the end thereof opposite from pivot pin bore 138 is a finger 144. Extending normal to finger 144 at the remote end thereof is a foot 146 which projects away from pivot pin bore 138 in a direction generally parallel to the length of discharge plate 104. Foot 146 has a generally horizontal upper surface 148 and a lower surface 150, which will be referred to hereafter as an "orientation control surface." Orientation control surface 150 comprises two upwardly inclined faces 152, 154, so that foot 146 has a generally triangular cross-section. Orientation control surface 150 is used in a manner to be described subsequently to tilt discharge plate 104 upwardly about pivot pin 136 from the substantially horizontal position of discharge plate 104 in which it rests on discharge plate brace 140.

In summary, each chain attachment assembly 50 comprises a roller 100 rotatably supported by a roller mount 102 to which is pivotally mounted a discharge plate 104. Roller mount assembly 50 thus includes one of each of the three distinct components which are attached directly or indirectly to the chain of a sorter apparatus according to the teachings of the present invention to achieve the aforementioned objects thereof. The chain attachment assembly is thus helpful in understanding the manner in which those components are attached and maintained on a sorter chain, such as sorter chain 40. Nevertheless, a complete grasp of the interaction and cooperative functioning of the three types of elements attached to such a sorter chain, is facilitated by a discussion of those same three basic components, the roller 100, the roller mount 102, and the discharge plate 104, in various other functional groupings which will be defined and utilized in the explanations which follow. In terms of function, each chain attachment assembly 50 serves to attach to and maintain on sorter chain 40 one of each of the three types of elements by which the singulating, object rotating, and object discharging functions of mechanical sorter 10 are accomplished.

Returning to FIG. 1, in input section 60 of mechanical sorter 10, articles of produce 12 are supplied by way of feed mechanism 68 to the plurality of chain attachment assemblies 50 secured to sorter chain 40. There, the rotatably mounted rollers 100 in chain attachment assemblies 50 in cooperation with retaining walls 90, 92, singulate articles of produce 12 so that successive articles of produce 12 are thereafter transported by sorter chain 40 substantially adjacent to one another. As used herein, the term "substantially adjacent" when applied to objects, such as produce 12 transported on sorter chain 40, means that individual objects are neither stacked on top of one another nor separated by a significant distance.

The freely rotatable round upper surfaces of rollers 100 in roller mounts 102 constitute the only surface encountered by produce 12 being fed onto mechanical sorter 10 by feed mechanism 68. The surface thus presented is one upon which no stacking or piling of produce 12 can occur. The series of freely rotatable cylindrical surfaces presented by rollers 100 render it impossible to support the weight of any articles of produce 12 piled on top of one another. The only stable position that may be assumed by an article of produce 12 is one between adjacent rollers 100, centered at cylindrical sections 108 thereof. The shape of rollers 100 in chain attachment assemblies 50 in cooperation with the inclined surface retaining walls 90, 92, direct produce 12 to the center of the conveying path defined by the top portion of sorter chain 40, where individual articles of produce 12 settle into positions between adjacent pairs of chain attachment assemblies 50. The components of chain attachment assemblies 50 are so sized to facilitate this singulating process.

Discharge plate 104 disposed between adjacent rollers 100 does not participate in supporting articles of produce 12, either during singulation or thereafter. A contrary arrangement would impair efficient rotation for purposes of optical scanning, as well as impairing singulation by providing a non-rotatable surface upon which produce 12 could be stably supported so as to serve as a base upon which to stack additional produce 12 in a non-singulated manner. Each article of produce 12 transported through mechanical sorter 10 thus bridges adjacent rollers 100 on the top surface of sorter chain 40.

Both the singulation and the support of produce 12 along the conveying path defined by the upper portion of sorter chain 40 is accomplished exclusively by adjacent pairs of rollers 100 rotatably mounted in roller mounts 102, which are in turn releasably secured by previously disclosed means to sorter chain 40. For this reason, each roller 100 in combination with the roller mount 102 in which it is supported will be referred to hereafter as a singulating support assembly. As seen to best advantage in FIG. 4, each singulating support assembly attached to sorter chain 40 cooperates with the singulating support assembly adjacent thereto to both isolate individual articles of produce 12 from each other and to support those individual articles of produce 12 during transport through mechanical sorter 10.

A chain attachment assembly can thus alternatively be viewed as comprising a singulating Support assembly in combination with fastening means for releasably securing the singulating support assembly to sorter chain 40 and a discharge plate 104 pivotally mounted to the singulating support assembly by means of pivot pin 136 of roller mount 102 thereof. Nevertheless, as seen in FIG. 5 discharge plate 104 between adjacent pairs of singulating support assemblies is below and out of contact with any article of produce 12 supported between rollers 100 of those adjacent singulating support assemblies.

An additional feature of the type of support afforded to individual articles of produce 12 by adjacent singulating support assemblies is that produce 12 thus supported may be rotated in situ to afford access to additional portions of the surface thereof for optical scanning purposes. This is accomplished by rotating the two rollers 100 upon which a given article of produce 12 is supported and transported throughout mechanical sorter 10. As produce 12 rests exclusively on two such adjacent rollers 100, produce 12 will rotate therewith, but in an opposite direction therefrom. Were produce 12 supported between adjacent rollers 100 to rest on the discharge plate 104 therebetween, this process would be impeded. The capacity to rotate singulated articles of produce 12 on sorter chain 40 is utilized advantageously in mechanical sorter 10 at scanning station 64.

Thus, in accordance with the present invention, rotation control means are provided for interacting with rollers, such as rollers 100, to rotate produce 12 supported thereupon. As shown in FIG. 4 by way of illustration, and not limitation, intermediate the viewing ranges of optical scanning devices, such as optical scanning devices 70, 72, along the conveying path of mechanical sorter 10 is a stationary ramp 160 the upper face of which defines a roller rotation surface 162. Ramp 160 is so positioned adjacent the conveying path of mechanical sorter 10 as to contact circumferential portions 114 of rollers 100 projecting through roller access windows 127 as movement of sorter chain 40 draws the singulating support assemblies 50 through scanning station 64. The extreme ends of roller rotation surface 162 may be beveled at 164 to facilitate the smooth passage of rollers 100 onto and off of roller rotation surface 162.

In FIG. 4, rollers 100A, 100B, rotatably supporting article of produce 12A therebetween are in engagement with ramp 160. Sorter chain 40 and its contents are moving in the direction shown in arrow B. Prior to the engagement of ramp 160 by rollers 100A, 100B, article of produce 12A was scanned by optical scanning device 70. The passage of rollers 100A and 100B over ramp 160 produces rotation therein in the direction indicated by arrows F and G, respectively. This in turn produces rotation in the direction indicated by arrow H of article of produce 12A rotatably supported between rollers 100A, 100B. Once movement of sorter chain 40 in the direction indicated by arrow B draws rollers 100A, 100B past contact with ramp 160, the rotation indicated by arrows F and G and, correspondingly the rotation of article of produce 12A shown by arrow H, terminates. Scanning of article of produce 12A by optical scanning device 72 then occurs.

While roller rotation surface 162 is depicted in FIG. 4 as fixed relative to the conveying path of mechanical sorter 10, an equally workable alternative rotation control means could comprise a roller rotation surface which is itself moveable, such as a rotatably-driven belt located adjacent the conveying path of mechanical sorter 10 in the position of ramp 160. The direction and speed of such a belt would determine the extent of rotation imparted to passing produce 12, supported on rollers 100A, 100B.

In addition, the location of ramp 160 should be variable to permit rotation of produce 12 to occur at any desired location of scanning station 64. Further, the length of roller rotation surface 162 may be adjusted to effect different degrees of rotation in passing produce 12. One way in which this can be accomplished is through the provision of several interchangeable ramps 160 of various length. Thus, an article of produce 12 could be rotated twice by 120° on ramps 160 of a first length. If scanned prior and subsequent to, as well as between, the two rotations, the produce 12 will be completely examined by the scanning means of scanning station 64. In the alternative, using a shorter ramps 160, produce 12 could be rotated three times by only 90°, and yet could be equally thoroughly examined, if scanned before and after the series of three rotations and between each.

In the context of the present invention, it is useful to define as a conveying pocket for each singulated article of produce 112 the space between adjacent rollers 100 on sorter chain 40. Each such conveying pocket thus rotatably supports an individual article of produce 12 along the conveying path of mechanical sorter 10. Importantly, the center portion of each conveying pocket of the present invention provides no support whatsoever to the produce 12 rotatably carried therein. Instead, each article of produce 12 is entirely supported at the sides of the conveying pocket by rotatable rollers 100. Discharge plate 104 between rollers 100 of the conveying pocket is below the produce 12 supported therebetween and does not participate in its support. The conveying pocket of the present invention does, however, interact with the rotation control means at scanning station 64 to rotate the produce 12 supported in the conveying pocket to any desirable extent.

The discharge function of chain attachment assemblies 50 will now be discussed generally, first in relation to FIG. 5. There it can readily be appreciated that an upward force exerted on foot 146 of discharge plate 104A will cause discharge plate 104A to be lifted up from brace 140 and rotated about pivot pin 136. In the process, discharge plate 104A will initially encounter the lower surface of any object, such as article of produce 12A, being carried within the conveying pocket above discharge plate 104A. Further movement of discharge plate 104A in the same direction will both lift produce 12A upwardly from its support on the rollers on either side of discharge plate 104A and tilt produce 12A in the direction of pivot pin 136. Ultimately, this combination of lifting and tilting applied to article of produce 12A will result in article of produce 12A being tipped off the side of sorter chain 40 in the direction of pivot pin 136.

Thus, in accordance with the present invention, activation means are provided for tilting selected individual ones of the discharge plates upward in order to tip objects supported in the conveying pocket off the side of the sorter chain. As shown by way of example, and not limitation, in FIG. 6 at each discharge location in output section 62, mechanical sorter 10 is provided with activation ramps, such as activation ramps 170, 172, positioned adjacent the conveying path defined by the upper portion of sorter chain 40. Corresponding diverter arms 174, 176 are located at the end of its activation ramps 170, 172, respectively, closest to scanning station 64. Each discharge plate 104 being drawn through output section 62 in the direction indicated by arrow B in FIG. 6 thus initially passes a given diverter arm and then the activation ramp corresponding thereto.

Activation ramps 170, 172 are so positioned as to be capable of interacting with the orientation control surface 150 of each discharge plate 104 when sorter chain 40 moves chain attachment assemblies 50 past. In the resulting interaction the selected individual orientation control surface 150 is raised by its passage over the activating ramp. Correspondingly, the discharge plate 104 attached thereto is tilted about the pivot pin 136 on which it is mounted. Whether or not a given orientation control surface 150 interacts with an activation ramp is determined by the position of the diverter arm associated therewith. Each diverter arm is independently controlled according to information about articles of produce 12 obtained in scanning station 64. Diverter arms 174, 176 may be thusly controlled, for example, by solenoids 178, 180, respectively. It should be understood,.however, that any alternative means of controlling the orientation of a diverter arm such as diverter arms 174, 176 is equally acceptable according to the principles of the present invention.

Each diverter arm has an activated position and a non-activated position. In FIG. 6, diverter arm 174 is shown in its non-activated position. As can be appreciated by reference to FIGS. 6 and 7 in combination, in the non-activated position of a diverter arm 174, a passing orientation control surface, such as control surface 150B, will travel above diverter arm 174. Discharge plate 104B attached thereto will remain in its substantially horizontal position.

Activation ramps 170, 172 are so dimensioned and positioned that the orientation control surfaces of passing discharge plates will not normally interact therewith. As best appreciated for example by reference to FIG. 6 and 8 taken together, upper surface 148C of control surface 150C passes beneath activation ramp 170, so that orientation control surface 150C does not interact therewith. As a result, article of produce 12C supported in the carrying pocket above discharge plate 104C continues to be rotatably transported and supported along the conveying path of mechanical sorter 10 in the direction indicated by arrow B. This is the consequence at each given discharge location in output section 62 where the diverter arm associated with the activation ramp located there is in the non-activated position.

In contrast, at discharge locations in output section 62 where the diverter arm is moved into its activated position, objects are discharged. As seen in FIG. 6, diverter arm 176 has been rotated into its activated position by solenoid 180.

In that position, the top surface 182 of diverter arm 176 slopes upwardly in alignment with the lead surface 184 of activation ramp 172. Diverter arm 176 is moved into such a position because the next article of produce 12D on sorter chain 40 that is to pass diverter arm 176 has characteristics detected in scanning station 64 which warrant its removal at the discharge location corresponding to diverter arm 176. When a diverter arm is in the activated position, the orientation control surface 150 is directed onto and over the activation ramp.

For example, as best seen by reference to FIG. 6 and 9 taken together, continued movement of discharge plate 104D in the direction indicated by arrow B will result in inclined face 154D of orientation control surface 150D encountering upper surface 182 of diverter arm 176. Continued movement of discharge plate 104D in the same direction will result in orientation control surface 150D riding upwardly along upper surface 182 toward and eventually onto lead surface 184 of activation ramp 172. Corresponding foot 146D and discharge plate 104D will be tilted upwardly and article of produce 12D carried in the conveying pocket thereabove will begin to be lifted and tilted off of sorter chain 40 in the direction of pivot pin 136D.

Eventually, as an orientation control surface reaches the top surface of the activation ramp, the corresponding article of produce will be tipped entirely from the conveying pocket in which it is being carried. As shown in FIGS. 6 and 10 taken together, orientation control surface 150E of discharge plate 102E has been drawn practically to the top of lead surface 184 of activation ramp 172 to the point that the downwardly oriented vertex of the cross-section of foot 146E is about to ride upon and across upper surface 186 of activation ramp 172. This has produced upward motion in discharge plate 104E in the direction show by arrow I. Thereafter, orientation control surface 150E will descend inclined trailing surface 188 of activation ramp 172, and discharge plate 104E will resume its substantially horizontal position. In the process produce 12E that had been transported along the conveying path defined by the upper portion of sorter chain 40 from input station 60 to output station 62 in the conveying pocket above discharge plate 104E will have been unloaded in the direction of pivot pin 136E, as shown by arrow J.

Importantly, in the mechanics of the discharge process, it is the center portion, rather than the sides of the conveying pocket that is lifted. The unloading movement imparted to the article of produce 12 is thus applied to the center thereof. Accordingly, in the method and apparatus of the present invention, the discharge of a single article of produce 12 involves no application of asymmetrical unloading forces, as occurs in known sorters in which objects or articles transported are supported at the center of each conveying pocket, but discharged by lifting the outer edges thereof. Therefore, in unloading produce 12 by the method or apparatus of the present invention, little or no momentum is imparted thereto which is parallel to the conveying path. Accordingly each article of produce 12 removed from sorter chain 40 is discharged in a controlled manner.

Further, in order to discharge a specific article of produce 12, movement of only a single corresponding part attached to sorter chain 40 is required. Thus, once the single discharge plate associated with a article of produce 14 to be unloaded has passed the diverter arm at the discharge location where unloading is to occur, that discharge arm can be lowered from its activated to its non-activated position. The diverter arm involved need not remain in its activated position for more than a brief instant while the discharge plate passes by. There is no need, as in known sorters, for the diverter arm to remain in the activated position while two movable parts associated with each article to be discharged are drawn by. This significantly reduces the timing difficulties involved in producing proper functioning.

Finally, according to the present invention, in the process of removing produce 12 from any given conveying pocket of sorter 10, produce 12 being transported in adjacent carrying pockets is not disturbed. As best seen by reference to FIG. 6, neither article of produce 12D nor article of produce 12F in carrying pockets adjacent to that above discharge plate 104E are disturbed by the mechanical motions of discharge plate 104D required to unload the article of produce 12E, carried thereabove and shown only in FIG. 10. Thus, the stability of these adjacent articles of produce 12D, 12F has been preserved, to substantial advantage when compared with known discharge methods and apparatus.

Accordingly, in the method and apparatus of the present invention, it is possible to fully utilize each adjacent conveying pocket of the sorter chain involved, thereby efficiently utilizing the length thereof and contributing to the speed by which objects or articles or produce may be handled. The present invention thus involves a highly advantageous method and apparatus for discharging objects or articles of produce processed by a mechanical sorter. The precision and mechanical ease of discharging those objects or articles of produce is improved, while at the same time the objects or articles of produce transported substantially adjacent to one another and not destabilized by the discharge of an object or article of produce being carried immediately adjacent thereto.

The realization of these capabilities requires a plurality of only three different types of pieces attached directly or indirectly to the sorter chain. This arrangement further singulates the objects or article of produce being handled and supports them rotatably during their transport by the apparatus, thus enabling enhanced access to the surfaces thereof for scanning purposes.

Thus, all processing that occurs in mechanical sorter 10 in relation to a single given article of produce 12 is implemented by an object handling unit comprising two successive rollers 100 that support the articles of produce 12 and a discharge plate 104 pivotably mounted between the rollers 100, but below the article of produce 12 supported thereby. Each such object handling unit is capable of singulating articles of produce 12 in input section 60 and thereafter rotatably transporting individual ones thereof along the conveying path of mechanical sorter 10.

In scanning station 64, the object handling unit, and in particular the circumferential portion 114 of rollers 100 thereof, interacts with the rotation control means of the present invention to rotate the article of produce 12 being transported in the object handling unit by any desired amount for scanning purposes. Based on information derived during scanning of the article of produce 12, the discharge plate 104 of the object handling unit is thereafter lifted by its interaction with an activation means of the present invention located at the discharge location appropriate to the given article of produce 12, and that produce 12 is tipped from sorter chain 40 onto a suitable collection means for grouping in accordance with the predetermined sorting criteria.

As chain attachment assemblies 50 travel around sprocket wheel 34 in the direction indicated by arrow A, discharge plates 104 under the influence of gravity tilt downwardly from their normal horizontal position resting on discharge plate braces 140. Thus, discharge plates 104 will hang downwardly as they travel along the lower portion of sorter chain 40 returning toward sprocket wheel 38. Unless discharge plates 104 are thereafter properly repositioned in the substantial horizontal positions thereof, resting upon discharge plate brace 140, the plurality of chain attachment assemblies 50 will be unable to properly receive and singulate produce 12 in input section 60. In order to eliminate this potential difficulty, a curved reset bar 192 is positioned adjacent the lower section of sorter chain 40 directly below sprocket wheel 38. Thus, as chain attachment assemblies 50 travel upward below sprocket wheel 38, reset bar 192 pushes discharge plates 104 into the substantially horizontal position thereof that is appropriate to receiving produce 12 from feed mechanism 68.

FIG. 11 depicts the components of an alternative embodiment of a chain attachment assembly 200 incorporating teachings of the present invention for use in an apparatus such as mechanical sorter 10. In the discussion of chain attachment assembly 200, to the extent possible, the same reference numerals will be utilized to identify components which are identical in structure and function to those found in chain attachment assembly 50 shown in FIG. 2. Thus, chain attachment assembly 200 comprises a roller 100 and a roller mount 102 as described previously, but in combination with a discharge plate 204. In FIG. 12 the components of chain attachment assembly 200 are depicted assembled one to another and removably attached to a sorter chain 40.

Discharge plate 204 is pivotably mounted on pivot pin bore 138 thereof to roller mount 102 using pivot pin 136. Roller mount 102 with roller 100 supported therein is in turn releasably secured to sorter chain 40 using resilient legs 128. It will be appreciated that a succession of chain attachment assemblies 200 thus secured to sorter chain 40 will permit the singulation and rotation for optical scanning purposes of objects to be processed by mechanical sorter 10. The discharge of such objects from the carrying pocket between successive rollers 100 is effected by the upward tilting of discharge plate 204 about pivot pin 136. Nevertheless, in chain attachment assembly 200 tilting of discharge plate 204 is effected in a different manner than previously described in relation to discharge plate 104.

Depending from discharge plate 204 at the end thereof adjacent to pivot pin bore 138 is a cylindrical finger 206. Finger 206 has generally a vertical curved side 208, which will be referred to hereafter as an "orientation control surface". Orientation control surface 208 is used in a manner to be described subsequently to tilt discharge plate 204 upwardly about pivot pin 136 from the substantially horizontal position discharge plate 204 occupies when it rests on discharge plate brace 140.

As best appreciated by reference to FIGS. 13A or 13B, a force exerted on the remote end of cylindrical finger 206 so as to push finger 106 the direction of sorter chain 40 will cause discharge plate 204 to be pivoted upwardly. In the process discharge plate 204 will initially encounter the lower surface of any object being carried within the conveying pocket thereabove. Further movement of discharge plate 204 in the same manner will both lift any such object upwardly from its support on the rollers 100 on either side of discharge plate 204 and tilt that object in the direction of pivot pin 136. Ultimately, this combination of lifting and tilting will result in the object being tipped off the side of sorter chain 40. The entire discharge process is controlled on a selective basis when movement of sorter chain 40 in the direction shown by arrow K in FIG. 12 draws chain attachment assemblies 200 through the output section of an optical sorter.

Thus, in accordance with the present invention corresponding activation means are provided for tilting selected individual discharge plates 204. As shown by way of example and not limitation, in FIG. 12 at each discharge location an activation ramp 220 is positioned adjacent the conveying path defined by sorter chain 40. A diverter arm 222 is located at the lead end 224 of each activation ramp 220 closest to the source of objects being processed. Each discharged plate 204 being drawn through the output section initially passes a diverter arm 222 and then the activation ramp 220 corresponding thereto.

Activation ramps 220 are so positioned as to be capable of interacting on a selected basis with individual orientation control surfaces 208 of each cylindrical finger 206 when sorter chain 40 moves chain attachment assemblies 200 past. In the resulting interaction the selected individual orientation control surface 208 is deflected in a substantially horizontal direction toward sorter chain 40 by activation ramp 220. Correspondingly, discharge plate 204 attached thereto is tilted about pivot pin 136 on which it is mounted. Whether or not a given orientation control surface 208 interacts with an activation ramp is determined by the position of the diverter arm associated therewith. Diverter arm 222 is controlled, for example, by a solenoid 226, which is operated according to information obtained in optical scanning.

In FIG. 12, diverter arm 222 is shown in solid lines in its non-activated position and in dash lines in the activation position thereof. As can be appreciated by reference to FIGS. 12 and 13A in combination, in the non-activated position of diverter arm 222, passing orientation control surface 208 on cylindrical finger 206 will travel past diverter arm 222 without any contact, and discharge plate 204 attached thereto will remain in its substantially horizontal position. Activation ramp 220 is so dimensioned and positioned that orientation control surface 208 of passing discharge plates 204 will travel parallel to activation ramp 220 without making contact therewith, unless deflected. Objects supported in the carrying pocket above discharge plate 204 then will continue to be rotatably transported and supported along the conveying path of mechanical sorter 10.

Different consequences result when diverter arm 222 is moved into its activated position shown in dashed lines in FIG. 12 and in solid lines in FIG. 13B. In that case lead surface 228 of diverter arm 222 points inwardly toward sorter chain 40 in substantial alignment with a tapered lead surface 230 at lead end 224 of activation ramp 220.

FIGS. 14, 15, and 16 taken together illustrate the effect on chain attachment assemblies 200 of actuation of diverter arm 222. In FIG. 15 passing orientation control surface 208F has been drawn by the motion of sorter chain 40 to encounter lead surface 228 of diverter arm 222. Continued movement of sorter chain 40 results in finger 206 being deflected by diverter arm 222 in a substantially horizontal direction onto and along tapered lead surface 230 of activation ramp 220. Correspondingly, discharge plate 204F will be tilted upwardly in the direction of arrow L, so that produce 12F carried in the conveying pocket thereabove will be tilted in the direction of pivot pin 136F.

As further shown in FIG. 16, orientation control surface 208G has reached the end of tapered lead surface 230 on activation ramp 220 and begun to slide along the side surface 232 of activation ramp 220 that faces sorter chain 40. The corresponding article of produce 12G carried in the conveying pocket above discharge plate 204G has been tipped in the direction of pivot pin 136G to an extent that it is about to be discharged entirely from sorter chain 40. Thereafter, orientation control surface 208G will descend inclined trailing surface 234 of activation ramp 220, and discharge plate 204 will resume its substantial horizontal position, like the other discharge plates 204 in FIG. 14. In the process, the unloading movement imparted to the object thusly discharged is applied to the center thereof, and only a single corresponding part attached to sorter chain 40 is moved in the process. This is accomplished without disturbing objects resting in adjacent the carrying pockets.

It should be noted that cylindrical fingers 206 impede access to the circumferential portions 114 of rollers 100 on the side thereof adjacent pivot pins 136. Accordingly, when alternate chain attachment assemblies 200 are utilized, the rotation control means in the scanning section of the mechanical sorter should be located on the side of sorter chain 40 opposite from cylindrical fingers 206.

To facilitate the rapid handling of a large volume of produce 12, several mechanical sorters 10 may be positioned in parallel adjacent one another to form a large-capacity optical sorting system. In such a case, feed mechanism 68 would be appropriately widened in order to supply articles of produce 12 to each of the conveyors of the system. In addition, the belts of a collection conveyor, such as collection conveyor 80, would be extended beneath all of the sorter chains of the system so as to collect sorted articles of produce 12 discharged from each sorter chain. In some instances, a single scanning device or devices could be used to scan the articles of produce 12 on several adjacent sorter chains of the system.

In summary, a method for sorting objects or articles of produce in accordance with a predetermined sorting criteria has been disclosed in which individual of the objects or articles or produce 12 are rotatably supported between adjacent pairs of a sequence of rollers 100 above selectively tiltable discharge plates 104. The sequence of rollers 100 bearing articles of produce 12 are thereafter moved past a roller rotation surface 162 capable of interacting with rollers 100 to rotate produce 12 supported thereon. Produce 12 is scanned by suitable scanning means to detect the presence of the predetermined sorting criteria. Finally, the sequence of rollers 100 with produce 12 supported therebetween is advanced past an activation means. Responsive to the scanning means, the activation means selectively tilts individual ones of the discharge plates 104 upward to tip corresponding produce 12 from between adjacent pairs of rollers 100.

While sorter 10 has particular applicability to sorting objects, such as articles of produce 12, it should be understood that the teachings of the present invention find ready applicability to sorters of objects of all types.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for handling objects comprising:

(a) conveying means for rotatably supporting and transporting the objects along a conveying path from an object input station to an object output station, said conveying means comprising a frame, a chain movably suspended from said frame along said conveying path and comprising a plurality of links connected to form an endless loop, and a plurality of chain attachment assemblies releasably secured to said chain, and wherein said chain attachment assemblies are sized and positioned on said chain so that the objects transported by said conveying means are individually supported and rotated between adjacent pairs of said chain attachment assemblies, and wherein each of said chain attachment assemblies comprise:

(b 1) a roller which provides rotating support of objects supported on said conveying means;

(2) a roller mount supporting said roller for rotation on an axis substantially normal to said conveying path., whereby said objects are rotated while being conveyed;

(3) fastening means for releasably securing said roller mount to said chain; and (4) a discharge plate supported by said roller mount so as to be disposed in a substantially horizontal position between said rollers of adjacent pairs of said chain attachment assemblies sufficiently below an object supported on said conveying means that said object is not substantially contacted by said discharge plate so that the object is freely rotated upon said rollers prior to discharge of the object.

2. An apparatus for handling objects as recited in claim 1, wherein said chain attachment assemblies are sized and positioned on said chain such that successive of said objects being transported by said conveying means are substantially adjacent to one another.

3. An apparatus for handling objects as recited in claim 1, wherein said fastening means releasably secures said roller mount to an individual link of said chain.

4. An apparatus for handling objects as recited in claim 3, wherein said fastening means comprises a pair of resilient legs depending from said roller mount.

5. An apparatus for handling objects as recited in claim 4, wherein the end of each of said resilient legs remote from said roller mount is formed into a hook that fits around the bottom of the sides of said individual link of said chain to releasably secure said roller mount to the top of said individual link.

6. An apparatus for handling objects as recited in claim 5, wherein said hooks extend outwardly from said pair of resilient legs and said pair of resilient legs are inserted inside said individual link of said chain when said roller mount is releasably secured thereto.

7. An apparatus for handling objects as recited in claim 1, wherein said roller comprises:

(a) a cylindrical central section of relatively reduced diameter; and (b) frusto-conical peripheral sections coaxial with said central section and located at each end thereof, the larger ends of said peripheral sections being remote from said central section.

8. An apparatus for handling objects as recited in claim 1, wherein said discharge plate is upwardly concave.

9. An apparatus for handling objects as recited in claim 1, wherein the edges of said discharge plate opposing said rollers of adjacent pairs of said chain attachment assemblies generally match the profile of said rollers.

10. An apparatus for handling objects as recited in claim 1, wherein said roller mount further comprises a pivot pin, and said discharge plate is provided with a pivot pin bore for slidably receiving said pivot pin to pivotally mount said discharge plate upon said roller mount.

11. An apparatus for handling objects as recited in claim 10, wherein said pivot pin is located at one side of said roller mount projecting therefrom generally parallel to said conveying path.

12. An apparatus for handling objects as recited in claim 11, wherein said roller mount further comprises a discharge plate brace on the side of said roller mount opposite from said pivot pin, said discharge plate brace in combination with said pivot pin supporting said discharge plate in said substantially horizontal position thereof.

13. An apparatus for handling objects as recited in claim 10, wherein said discharge plate further comprises an orientation control surface for interaction with an activation means disposed adjacent the conveying path to tilt said discharge plate about said pivot pin and tip onto said receiving means an object supported between the pair of said chain attachment assemblies adjacent to said discharge plate.

14. An apparatus for handling objects as recited in claim 1, further comprising collection means located at the object output station for receiving objects discharged from said conveyor means; said collection means comprises a plurality of conveyors.

15. An apparatus for handling objects as recited in claim 14, wherein said plurality of conveyors are parallel to each other.

16. An apparatus for handling objects comprising:

(a) a frame;

(b) a chain movably suspended from the frame along a conveying path, said chain comprising a plurality of links connected to form an endless loop;

(c) a plurality of chain attachment assemblies releasably secured to said chain, said chain attachment assemblies rotatably supporting individual of the objects between adjacent pairs of said chain attachment assemblies, and each of said chain attachment assemblies comprising:

(i) a singulating support assembly, each of said singulating support assemblies cooperating with the singulating support assembly of the chain attachment assembly adjacent thereto to provide a means for rotating therebetween individual of the objects, whereby said objects are rotated while being conveyed;

(ii) fastening means for releasably securing said singulating support assembly to said chain; and (iii) a discharge plate pivotally mounted to said singulating support assembly in a substantially horizontal position between adjacent pairs of said singulating support assemblies sufficiently below an object supported therebetween that said object is not substantially contacted by said discharge plate so that the object is freely rotated upon said rotating means prior to discharge of the object; and (d) activation means for selectively tilting individual ones of said discharge plates to tip from between the pair of singulating support assemblies on either side of an individual discharge plate an object supported between said pair of singulating support assemblies.

17. An apparatus for handling objects as recited in claim 16, wherein said discharge plate is pivotally mounted to said singulating support assembly for tilting about an axis parallel to said conveying path.

18. An apparatus for sorting objects in accordance with predetermined sorting criteria as recited in claim 17, wherein said discharge plate further comprises an orientation control surface for interaction with said activation means to tilt said discharge plate.

19. An apparatus for sorting objects in accordance with predetermined sorting criteria as recited in claim 18, wherein said activating means comprises:

(a) a ramp positioned adjacent said conveying path, said ramp interactable with selected individual ones of said orientation control surfaces to tilt selected individual ones of said discharge plates when said chain moves said chain attachment assemblies past said ramp; and (b) a selectively operable diverter arm located adjacent said conveying path at one end of said ramp, said diverter arm having an activated position in which selected individual ones of said orientation control surfaces are directed into interaction with said ramp and a non-activating position in which said orientation control surface avoids interaction with said diverter arm and said ramp.

20. An apparatus for sorting objects in accordance with predetermined sorting criteria as recited in claim 17, wherein said singulating object support assembly comprises:

(a) a roller mount releasably securable to an individual link of said chain; and (b) a generally cylindrical roller supported by said roller mount for rotation on an axis substantially normal to said conveying path.

21. A system for handling objects, comprising:

(a) a conveyor comprising an endless flexible member movable along a conveying path; and (b) an object handling unit fixed to said flexible member, said handling unit comprising:

(i) first and second rollers upheld at distinct longitudinal points on said flexible member for rotation on axes substantially normal to said conveying path, said first and second rollers together rotatably supporting an individual one of the objects when the objects are transported by said conveyor along said conveying path, whereby said objects are rotated by said rollers while being conveyed; and (ii) a discharge plate pivotally mounted between said first and second rollers sufficiently below the object so that the object is not substantially contacted by said discharge plate and is free to rotate between said rollers prior to discharge of the object, said discharge plate comprising means for upward tilting to tip said individual one of the objects from between said first and second rollers off the side of said conveyor.

22. A system for handling objects as recited in claim 21, wherein said first and second rollers are upheld for rotation by corresponding first and second roller mounts respectively, said first and second roller mount being secured to said flexible member and said first roller mount being provided with a pivot pin extending substantially parallel to said conveying path in the direction of said second roller mount for pivotally mounting said discharge plate between said first and second rollers.

23. A system for handling objects as recited in claim 22, wherein said discharge plate is retained on said pivot pin of said first roller mount by said second roller mount.

24. A system for handling objects as recited in claim 23, comprising a plurality of said object handling units secured adjacent one another along the length of said flexible member.

25. A system for handling objects as recited in claim 24, wherein said first and second roller mounts are substantially identical and the first roller mount of one object handling unit functions as the second roller mount of the object handling unit adjacent thereto.

26. A system for handling objects as recited in claim 21, further comprising an activation means for selectively tilting individual ones of said discharge plates.

27. A system for handling objects as recited in claim 26, wherein said activation means comprises:

(a) an activation ramp positioned adjacent said conveyor path, said activation ramp capable of interacting with individual ones of said discharge plates to tilt selectively individual ones thereof upward when said conveyor moves said handling units past said activation ramp; and (b) a diverter arm located adjacent said conveying path at one end of said activation ramp, said diverter arm being selectively positionable to direct individual ones of said discharge plates into interaction with said activation ramp.

28. A system for handling objects as recited in claim 21, further comprising rotation control means for interacting with said object handling units to rotate the objects.

29. A system for handling objects as recited in claim 28, wherein said rotation control means comprises a roller rotation surface located adjacent said conveying path for contacting circumferential portions of said first and second rollers simultaneously and imparting rotational motion thereto.

30. An apparatus for sorting objects in accordance with predetermined sorting criteria, the apparatus comprising:

(a) a chain comprised of a plurality of links movable along a conveying path from an object input station to an object output station;

(b) a plurality of chain attachment assemblies releasably secured to individual links of said chain, each of said chain attachment assemblies comprising:

(i) a generally cylindrical roller, said roller together with the roller of the chain attachment assembly on said chain adjacent thereto, together providing rotating support of individual of the objects therebetween;

(ii) a roller mount supporting said roller for rotation on an axis substantially normal to said conveying path whereby said objects are rotated while being conveyed;

(iii) fastening means for releasably securing said roller mount to an individual link of said chain; and (iv) a discharge plate pivotally mounted at one side of said roller mount disposed in a substantially horizontal position between said rollers of adjacent pairs of said chain attachment assemblies sufficiently below an object supported between said rollers such that said objects are not substantially contacted by said discharge plate so that the object is freely rotated upon said rotating means prior to discharge of the objects, said discharge plate being provided with an orientation control surface for tilting selected individual ones of the discharge plates upwardly to tip from said rollers adjacent selected individual ones of said discharge plates an object supported therebetween;

(c) scanning means for detecting the presence of the predetermined sorting criteria in individual of the objects supported on said rollers;

(d) rotation control means for interacting with said rollers to rotate the objects supported thereon to increase the surface area of the objects accessible to said scanning means; and (e) activation means responsive to said scanning means for selectively interacting with individual ones of said orientation control surfaces to tilt selected individual ones of said discharge plates.

31. An apparatus for sorting objects in accordance with predetermined sorting criteria as recited in claim 30, wherein said orientation control surface is located on a finger projecting from said discharge plate.

32. An apparatus for sorting objects in accordance with predetermined sorting criteria as recited in claim 31, wherein said finger projects downwardly from said discharge plate.

33. An apparatus for sorting objects in accordance with predetermined sorting criteria as recited in claim 31, wherein said finger projects from said discharge plate at the end thereof adjacent said one side of said roller mount to which said discharge plate is pivotally mounted.

34. An apparatus for sorting objects in accordance with predetermined sorting criteria as recited in claim 31, wherein said finger projects from the side of the discharge plate opposite from said one side of said roller mount to which said discharge plate is pivotally mounted.

35. An apparatus for sorting objects in accordance with predetermined sorting criteria as recited in claim 31 wherein said orientation control surface is comprised of at least one substantially planar surface.

36. An apparatus for sorting objects in accordance with predetermined sorting criteria as recited in claim 31, wherein said orientation control surface comprises a curved surface.

37. An apparatus for sorting objects in accordance with predetermined sorting criteria as recited in claim 31 wherein said orientation control surface is lifted upwardly by interaction with said activation means.

38. An apparatus for sorting objects in accordance with predetermined sorting criteria as recited in claim 31 wherein said orientation control surface is deflected in a substantially horizontal direction by interaction with said activation means.

39. An apparatus for sorting objects in accordance with predetermined sorting criteria as recited in claim 30, wherein said activation means comprises:

(a) an activation ramp positioned adjacent said conveying path at said output station, said activation ramp interactable with selected individual ones of said orientation control surfaces to tilt said discharge plate corresponding thereto when said chain moves said chain attachment assembly past said activation ramp; and (b) a selectively operable diverter arm located adjacent said conveying path at one end of said ramp, said diverter arm having an activated position in which selected individual ones of said orientation control surfaces are directed by said diverter arm into interaction with said activation ramp and a non-activating position in which said orientation control surfaces avoid interaction with said diverter arm and said activation ramp.

40. An apparatus for sorting objects in accordance with predetermined sorting criteria as recited in claim 39, wherein said diverter arm is operated by a solenoid.

41. An apparatus for sorting objects in accordance with predetermined sorting criteria as recited in claim 30, wherein said rotation control means comprises a roller rotation surface located adjacent said conveying path for imparting rotation to said rollers,

42. An apparatus for sorting objects in accordance with predetermined sorting criteria as recited in claim 41, wherein the location of said roller rotation surface along said conveying path may be varied selectively.

43. An apparatus for sorting objects in accordance with predetermined sorting criteria as recited in claim 41 wherein the length of said roller rotation surface may be varied selectively.

44. An apparatus for sorting objects in accordance with predetermined sorting criteria as recited in claim 41 wherein said roller rotation surface is a fixed surface.

45. An apparatus for sorting objects in accordance with predetermined sorting criteria as recited in claim 41, wherein said roller rotation surface contacts circumferential portions of said rollers when said chain moves said chain attachment assemblies past said roller rotation surface.

46. An apparatus for sorting objects in accordance with predetermined sorting criteria as recited in claim 30 wherein said scanning means comprises an optical scanning device.

47. An apparatus for sorting objects in accordance with predetermined sorting criteria as recited in claim 30 wherein said scanning means comprises a line-scan camera.

48. An apparatus for sorting objects in accordance with predetermined sorting criteria as recited in claim 30, wherein said scanning means comprises a pair of optical scanning devices, and said rotation control means is located therebetween.

49. An apparatus for sorting objects in accordance with predetermined sorting criteria as recited in claim 30, wherein said scanning means and said rotation control means are located at substantially the same point along said conveying path.

50. An apparatus for sorting articles of produce in accordance with predetermined sorting criteria, the apparatus comprising:

(a) a frame;

(b) a sorter chain movably suspended from said frame along a conveying path between a produce input station and a produce output station, said chain comprising a plurality of links connected to form an endless loop;

(c) drive means for advancing said chain;

(d) a plurality of chain attachment assemblies individually and releasably secured adjacent one another to said individual of said links of said chain, each of said chain attachment assemblies comprising:

(i) a generally cylindrical roller having a central section of relatively reduced diameter, said roller and the roller of the chain attachment assembly adjacent thereto providing rotating support therebetween of individual of the objects from said produce input station to said produce output station;

(ii) a roller mount supporting said roller for rotation on an axis substantially normal said conveying path whereby said objects are rotated while being conveyed;

(iii) fastening means for releasably securing said roller mount to said chain; and (iv) a discharge plate pivotally mounted at one side of said roller mount in a substantially horizontal position between said roller and the roller of the sorter chain attachment assembly adjacent thereto and sufficiently below an object supported between said adjacent rollers so that said object is not substantially contacted by said discharge plate, whereby the object is freely rotated upon said adjacent rollers prior to discharge of the object;

(e) a roller rotation surface located adjacent said conveying path for imparting rotation to said rollers as said chain moves said chain attachment assemblies past said roller rotation surface;

(f) scanning means for detecting the presence of the predetermined sorting criteria in each of the articles of produce;

(g) collection means located at said produce output station for receiving the articles of produce such that each article of produce is grouped in accordance with the predetermined sorting criteria; and (h) activation means responsive to said scanning means for selectively tilting individual ones of said discharge plates to tip selected of the article of produce onto said collection means from between the pair of said chain attachment assemblies adjacent to said individual ones of said discharge plates.

51. An apparatus for handling objects as recited in claim 50, wherein said roller mount further comprises a pivot pin, and said discharge plate is provided with a pivot pin bore for slidably receiving said pivot pin to pivotally mount said discharge plate upon said roller mount.

52. An apparatus for sorting articles of produce in accordance with predetermined sorting criteria as recited in claim 51, wherein said discharge plate is provided with an orientation control surface for interacting with said activating means, and said activation means comprises:

(a) a plurality of activation ramps positioned adjacent said conveying path at said produce output station, said activation ramps interactable with said selected individual ones of said orientation control surfaces to pivot selected individual ones of said discharge plates when said chain moves said chain attachment assemblies past said activation ramps; and (b) a selectively operable diverter arm located adjacent said conveying path at one end of each of said activation ramps, said diverter arms each having activated positions in which selected ones of said orientation control surfaces are directed by said diverter arm into interaction with said activation ramp corresponding thereto and non-activating positions in which said orientation control surfaces of said cradle plates avoid interaction with said diverter arm and said activation ramp corresponding thereto.

53. An apparatus for sorting articles of produce in accordance with predetermined sorting criteria as recited in claim 52, wherein said orientation control surface is lifted upwardly by interaction with said activation ramps.

54. An apparatus for sorting objects in accordance with predetermined sorting criteria as recited in claim 52, wherein said orientation control surface is deflected in a substantially horizontal direction by interaction with said activation ramps.

55. An apparatus for sorting objects in accordance with predetermined sorting criteria as recited in claim 52, wherein said discharge plate further comprises a projecting finger and said orientation control surface is located at the remote end of said finger.

56. An apparatus for sorting objects in accordance with predetermined sorting criteria as recited in claim 55, wherein said remote end of said finger is formed into a cylinder and said activation ramps interact with the side surface of said cylinder to pivot selected individual ones of said discharge plates.

57. An apparatus for sorting objects in accordance with predetermined sorting criteria as recited in claim 56, wherein said finger is deflected in a substantially horizontal direction by interaction with said activation ramps.

58. An apparatus for sorting articles of produce in accordance with predetermined sorting criteria as recited in claim 52, wherein said scanning means comprises a pair of optical scanning devices, and said roller rotation surface is located between said pair of optical scanning devices.

59. A method for sorting objects in accordance with predetermined sorting criteria, the method comprising the steps of:

(a) rotatably supporting individual of the objects between adjacent pairs of a sequence of rollers, each said roller pair having therebetween a selectively tiltable discharge plate above which an object is rotated and supported by a said pair of rollers;

(b) moving said sequence of rollers past a roller rotation surface interacting with said rollers and thereby rotating the objects supported thereon;

(c) scanning each rotating object with a scanning means to detect the presence of the preselected sorting criteria; and (d) advancing said sequence of rollers past an activation means responsive to said scanning means, said activation means selectively tilting individual ones of said discharge plates upward to tip selected ones of said objects from between adjacent pairs of said sequence of rollers.

60. An off-loading conveyor comprising:

a support structure defining a conveying path;

an endless chain mounted on said support structure to extend along said conveying path;

rollers mounted to said chain for rotation on axes substantially normal to said conveying path, said rollers being mutually spaced apart and including support surfaces defining concavities between adjacent of said rollers;

off-loading elements mounted on said chain including levers and paddles, said paddles fitted through said concavities between adjacent of said rollers, each of said paddles having a retracted position facing said concavity and being pivotable about an axis substantially parallel to the path of travel of said chain, said paddles being aligned for passage from said retracted position through said concavities; and an actuator engageable with said levers to selectively pivot individual of said off-loading elements from said retracted position through said concavity.

* * * * *